(12) United States Patent
Kurita et al.

(10) Patent No.: US 12,217,411 B2
(45) Date of Patent: Feb. 4, 2025

(54) INSPECTION APPARATUS, UNIT SELECTION APPARATUS, INSPECTION METHOD, AND COMPUTER-READABLE STORAGE MEDIUM STORING AN INSPECTION PROGRAM

(71) Applicant: OMRON Corporation, Kyoto (JP)

(72) Inventors: Masashi Kurita, Kyoto (JP); Sakon Yamamoto, Kyoto (JP); Yuki Hasegawa, Kyoto (JP); Yuki Hanzawa, Kyoto (JP); Shigenori Nagae, Kyoto (JP); Yutaka Kato, Kyoto (JP)

(73) Assignee: OMRON CORPORATION, Kyoto (JP)

(*) Notice: Subject to any disclaimer, the term of this patent is extended or adjusted under 35 U.S.C. 154(b) by 299 days.

(21) Appl. No.: 17/999,715

(22) PCT Filed: May 28, 2021

(86) PCT No.: PCT/JP2021/020336
§ 371 (c)(1),
(2) Date: Nov. 23, 2022

(87) PCT Pub. No.: WO2021/261168
PCT Pub. Date: Dec. 30, 2021

(65) Prior Publication Data
US 2023/0222645 A1    Jul. 13, 2023

(30) Foreign Application Priority Data

Jun. 23, 2020  (JP) .................................. 2020-108201

(51) Int. Cl.
*G06T 7/00* (2017.01)
*G06V 10/72* (2022.01)
(Continued)

(52) U.S. Cl.
CPC ............. *G06T 7/0004* (2013.01); *G06V 10/72* (2022.01); *G06V 10/7715* (2022.01); *G06V 10/82* (2022.01)

(58) Field of Classification Search
CPC .......... G06V 10/757; G06T 7/33; G06T 7/001
See application file for complete search history.

(56) References Cited

U.S. PATENT DOCUMENTS 6,671,400 B1 * 12/2003 Ekpar .................. H04N 23/698
                                                       382/157
7,743,004 B2 *  6/2010 Matsugu ................ G06N 3/063
                                                       706/15
(Continued)

FOREIGN PATENT DOCUMENTS

CN       109741346 A    5/2019
JP       2008-028475 A  2/2008
(Continued)

OTHER PUBLICATIONS

Ma Mei-Rong et al., "Defect Detection of Mobile Phone Motherboard Based on RetinaNet", Computer Engineering & Science, Apr. 15, 2020, pp. 106-115, vol. 42, No. 4, China Academic Journal Electronic Publishing House; Relevance is indicated in the (translated) CNOA issued on Aug. 5, 2024.
(Continued)

Primary Examiner — Yosef Kassa
(74) Attorney, Agent, or Firm — METROLEX IP LAW GROUP, PLLC; Robert L. Scott, Esq.

(57) ABSTRACT

An inspection apparatus according to one or more embodiments extracts an attention area from a target image using a first estimation model, performs a computational process with a second estimation model using the extracted attention area, and determines whether a target product has a defect based on a computational result from the second estimation model. The first estimation model is generated based on
(Continued)

multiple first training images of defect-free products in a target environment. The second estimation model is generated based on multiple second training images of defects. The computational process with the second estimation model includes generating multiple feature maps with different dimensions by projecting the target image into different spaces with lower dimensions. The extracted attention area is integrated into at least one of the multiple feature maps in the computational process with the second estimation model.

20 Claims, 9 Drawing Sheets

(51) Int. Cl.
*G06V 10/77* (2022.01)
*G06V 10/82* (2022.01)

(56) References Cited

U.S. PATENT DOCUMENTS

| | | | | |
|---|---|---|---|---|
| 8,208,733 B2* | 6/2012 | Park | ......................... | G06V 20/52 |
| | | | | 382/199 |
| 8,331,650 B2* | 12/2012 | Yuan | ..................... | G06V 10/757 |
| | | | | 382/152 |
| 8,452,076 B2* | 5/2013 | Nakagaki | ............. | G06V 10/774 |
| | | | | 382/149 |
| 8,488,863 B2* | 7/2013 | Boucheron | ........... | G06T 7/0012 |
| | | | | 382/133 |
| 8,703,220 B2* | 4/2014 | Caldwell | ................. | A23L 19/05 |
| | | | | 426/94 |
| 2009/0238432 A1 | 9/2009 | Can et al. | | |
| 2011/0194752 A1 | 8/2011 | Pang | | |
| 2020/0167908 A1 | 5/2020 | Mizobe et al. | | |

FOREIGN PATENT DOCUMENTS

| | | |
|---|---|---|
| JP | 2012-026982 A | 2/2012 |
| JP | 2016-148747 A | 8/2016 |
| JP | 2019-211415 A | 12/2019 |
| JP | 2020-085705 A | 6/2020 |
| KR | 20160054846 A | 5/2016 |

OTHER PUBLICATIONS

Jiang Hongquan et al., "An Improved Convolutional Neural Network for Weld Defect Recognition", Journal of Mechanical Engineering, Apr. 30, 2020, pp. 235-242, vol. 56, No. 8, China Academic Journal Electronic Publishing House; Relevance is indicated in the (translated) CNOA issued on Aug. 5, 2024.

Chinese Office Action issued on Aug. 5, 2024 in counterpart CN Patent Application No. 202180035168.

English translation of the International Search Report ("ISR") of PCT/JP2021/020336 mailed on Aug. 3, 2021.

Written Opinion("WO") of PCT/JP2021/020336 mailed on Aug. 3, 2021.

\* cited by examiner

INSPECTION APPARATUS, UNIT SELECTION APPARATUS, INSPECTION METHOD, AND COMPUTER-READABLE STORAGE MEDIUM STORING AN INSPECTION PROGRAM

FIELD

The present disclosure relates to an inspection apparatus, a unit selection apparatus, an inspection method, and computer-readable storage medium storing an inspection program.

BACKGROUND

A known technique for inspecting products on, for example, a production line includes observing the products being manufactured with an image sensor and determining whether the products are defective based on captured images. For example, Patent Literature 1 describes an inspection apparatus that uses a first neural network trained to determine whether an inspection target in an image is normal or abnormal and uses a second neural network trained to classify the type of abnormality in response to determining that the inspection target is abnormal.

CITATION LIST

Patent Literature

Patent Literature 1: Japanese Unexamined Patent Application Publication No. 2012-026982

SUMMARY

Technical Problem

Machine learning models such as neural networks may be used to generate estimation models trained to perform intended estimation tasks through machine learning using training data. Thus, images of products determined either defective or non-defective may be used as training data in machine learning to generate an estimation model for visual inspection of products (e.g., Patent Literature 1). Such an estimation model may also be generated with a method other than machine learning, for example, manually. However, the inventors have noticed that an inspection method using such an estimation model generated based on training data may involve the issue described below.

One factor affecting the performance of an estimation model (specifically, the accuracy of visual inspection) may be the quality of training data used for generating the estimation model. A wider variety of collected training data sets (specifically, a wider variety of defects included in training data) may allow generation of an estimation model with higher performance. However, more types of defects and more types of background images including product appearance increase combinations of defect types and background types, for which more samples or more types of samples are to be collected as training data. Collecting such training data in advance for all possible situations in the target inspection environment may be costly and impractical.

Accordingly, one or more embodiments is directed to a technique for improving the accuracy of visual inspection using estimation models while reducing the cost of collecting training data.

The technique according to one or more embodiments has the structure described below.

An inspection apparatus according to one or more embodiments may include a data obtainer that obtains a target image of a target product to be inspected, an area extractor that extracts an attention area from the obtained target image using a first estimation model being generated by training to extract, as the attention area, an image area having a probability of a defect being included based on first training data including a plurality of first training images of defect-free products obtained in a target inspection environment, a model computation unit that performs a computational process with a second estimation model using the attention area extracted from the target image by the first estimation model, a determiner that determines whether the target product has a defect based on a computation result from the second estimation model, and an output unit that outputs information indicating a result of determining whether the target product has a defect. The second estimation model is generated by training to determine a likelihood of a defect being included based on second training data including a plurality of second training images of defects. The computational process with the second estimation model includes a plurality of projection processes performed on the target image. The plurality of projection processes include projecting the target image into different spaces with lower dimensions to generate a plurality of feature maps with different dimensions. The extracted attention area is integrated into at least one of the plurality of feature maps in the computational process with the second estimation model.

This structure uses, in visual inspection, the first estimation model generated based on the first training data including the plurality of first training images of defect-free products obtained in the target inspection environment, in addition to the second estimation model trained to determine the likelihood of a defect being included. The first estimation model designed specifically for the target environment is expected to improve the accuracy of visual inspection in the target environment. This structure also includes the computational process with the second estimation model that includes the plurality of projection processes including projecting the target image into different spaces with lower dimensions to generate a plurality of feature maps with different dimensions. The attention area extracted by the first estimation model is integrated into at least one of the feature maps in the computational process with the second estimation model. The attention area extracted by the first estimation model may be integrated into a feature map selected to maximize the accuracy of determining whether the target product has a defect. This structure may allow visual inspection of products with various appearances using the estimation models with improved accuracy.

In the inspection apparatus according to one or more embodiments, the second estimation model may include an encoder that converts an image into a feature and a decoder that decodes the image from the feature. The decoded image may indicate, for each pixel, a likelihood of a defect being included. The encoder may include a plurality of coding units connected in series sequentially from an input end of the encoder. Each of the plurality of coding units may convert input data into a feature map with a lower dimension than the input data. The plurality of projection processes performed on the target image may include computational processes performed with the plurality of coding units sequentially from the input end. The extracted attention area may be integrated into a feature map generated by at least one of the plurality of coding units in the computational process with the second estimation model. This structure may allow the dimension to be changed easily for integration with the attention area extracted by the first estimation model and may improve the accuracy of visual inspection with the estimation models through an easy operation.

The inspection apparatus according to one or more embodiments may further include a selector that selects at least one target coding unit from the plurality of coding units. The extracted attention area may be integrated into a feature map generated by the selected at least one target coding unit in the computational process with the second estimation model. This structure may allow selection of the target coding unit and may optimize the accuracy of visual inspection performed with the estimation models.

In the inspection apparatus according to one or more embodiments, the selector may obtain an evaluation image of a product for evaluation having a predetermined defect, extract an attention area from the obtained evaluation image using the first estimation model, iterate the computational process with the second estimation model using the attention area extracted from the evaluation image while changing a coding unit tentatively selected as the at least one target coding unit to perform, for each of the plurality of coding units, a trial determination as to whether the product for evaluation in the evaluation image has a defect with the coding unit being tentatively selected as the at least one target coding unit, and select an optimum coding unit as the at least one target coding unit based on a result of the trial determination. This structure may automatically optimize the accuracy of visual inspection performed with the estimation models.

In the inspection apparatus according to one or more embodiments, the selector may obtain an evaluation image of a product for evaluation having a predetermined defect, extract an attention area from the obtained evaluation image using the first estimation model, iterate the computational process with the second estimation model using the attention area extracted from the evaluation image while changing a coding unit tentatively selected as the at least one target coding unit to perform, for each of the plurality of coding units, a trial determination as to whether the product for evaluation in the evaluation image has a defect with the coding unit being tentatively selected as the at least one target coding unit, output a result of the trial determination to an operator, and receive selection of the at least one target coding unit from the plurality of coding units indicated by the operator. This structure may optimize the accuracy of visual inspection performed with the estimation models through an operation.

In the inspection apparatus according to one or more embodiments, the encoder may include a convolutional neural network, and each of the plurality of coding units may include one or more convolutional layers and one or more pooling layers. This structure may allow easy implementation of the second estimation model.

The inspection apparatus according to one or more embodiments may further include a setting unit that sets a value of a parameter defining a degree of occurrence of an image area including a defect being extracted as an attention area. The area extractor may extract the attention area in accordance with the set value of the parameter. This structure may allow adjustment of the degree by which the estimation result from the first estimation model is reflected and may optimize the accuracy of visual inspection performed with the estimation models in the target environment.

In the inspection apparatus according to one or more embodiments, the first estimation model may include an encoder that converts an image into a feature and a decoder that decodes the image from the feature. The area extractor may generate a target decoded image for the target image using the encoder and the decoder in the first estimation model, and calculate a difference area between the generated target decoded image and the target image. The parameter may include an expansion parameter defining a degree by which the difference area is to be expanded. The area extractor may obtain the extracted attention area by expanding the calculated difference area in accordance with a set value of the expansion parameter. This structure may allow easy adjustment of the degree by which the estimation result from the first estimation model is reflected.

In the inspection apparatus according to one or more embodiments, the extracted attention area may include an attention map. This structure uses the feature maps and the attention map that are both image data, allowing the extracted results to be easily integrated together.

In the inspection apparatus according to one or more embodiments, the first estimation model may be generated, by training through machine learning using the first training data, to extract, as an attention area, an image area having a probability of a defect being included. This structure may allow easy implementation of the first estimation model.

In the inspection apparatus according to one or more embodiments, the second estimation model may be generated, by training through machine learning using the second training data, to determine a likelihood of a defect being included. This structure may allow easy implementation of the second estimation model.

Another implementation of the inspection apparatus according to one or more embodiments may be an information processing method, a program, or a storage medium storing the program readable by, for example, a computer for implementing the components described above. The computer-readable storage medium includes a medium storing a program or other information in an electrical, magnetic, optical, mechanical, or chemical manner.

For example, an inspection method according to one or more embodiments is an information processing method implementable with a computer. The inspection method includes obtaining a target image of a target product to be inspected, extracting an attention area from the obtained target image using a first estimation model being generated by training to extract, as the attention area, an image area having a probability of a defect being included based on first training data including a plurality of first training images of defect-free products obtained in a target inspection environment, performing a computational process with a second estimation model using the attention area extracted from the target image by the first estimation model, determining whether the target product has a defect based on a computation result from the second estimation model, and outputting information indicating a result of determining whether the target product has a defect. The second estimation model is generated by training to determine a likelihood of a defect being included based on second training data including a plurality of second training images of defects. The computational process with the second estimation model includes a plurality of projection processes performed on the target image. The plurality of projection processes include projecting the target image into different spaces with lower dimensions to generate a plurality of feature maps with different dimensions. The extracted attention area is integrated into at least one of the plurality of feature maps in the computational process with the second estimation model.

For example, an inspection program according one or more embodiments is a program for causing a computer to perform operations including obtaining a target image of a target product to be inspected, extracting an attention area from the obtained target image using a first estimation model being generated by training to extract, as the attention area, an image area having a probability of a defect being included based on first training data including a plurality of first training images of defect-free products obtained in a target inspection environment, performing a computational process with a second estimation model using the attention area extracted from the target image by the first estimation model, determining whether the target product has a defect based on a computation result from the second estimation model, and outputting information indicating a result of determining whether the target product has a defect. The second estimation model is generated by training to determine a likelihood of a defect being included based on second training data including a plurality of second training images of defects. The computational process with the second estimation model includes a plurality of projection processes performed on the target image. The plurality of projection processes include projecting the target image into different spaces with lower dimensions to generate a plurality of feature maps with different dimensions. The extracted attention area is integrated into at least one of the plurality of feature maps in the computational process with the second estimation model.

The technique according to one or more embodiments may improve the accuracy of visual inspection with the estimation models.

DETAILED DESCRIPTION

Figure 1:
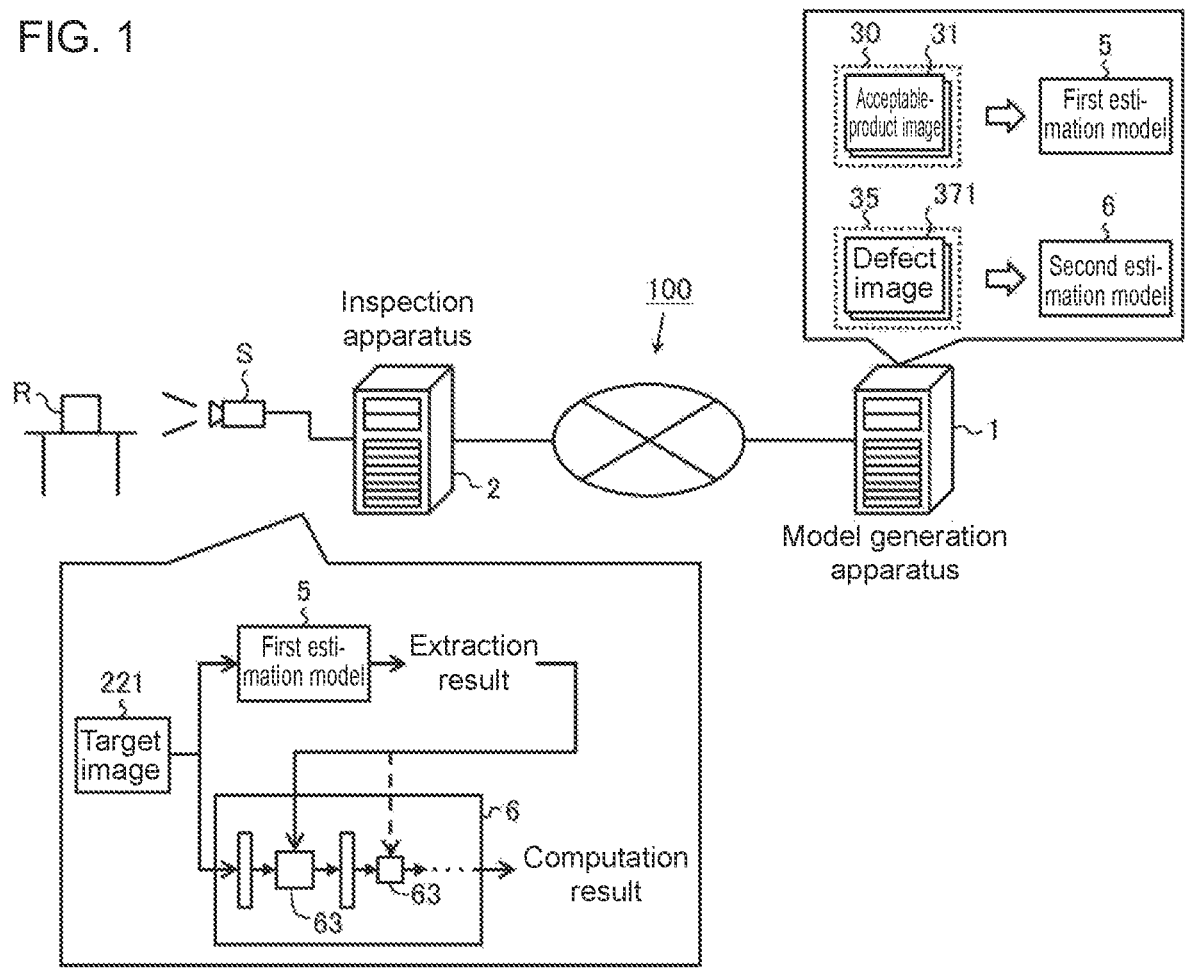
FIG. 1 is a schematic diagram illustrating an example situation in one or more embodiments.

In one aspect of the present invention, two estimation models, or a first estimation model and a second estimation model, are used for visual inspection. The first estimation model extracts an area having a high probability of a defect being included based on information about the appearance of defect-free products obtained in a target environment. The second estimation model determines whether any defect is included without referring to any target environment. The second estimation model can determine whether the target product has a defect. However, using the second estimation model alone may cause erroneous determinations depending on the appearance of the product in the target environment. For example, a product with an external pattern similar to a defect pattern may be erroneously determined as a product with a defect.

The first estimation model is additionally used in the visual inspection. The first estimation model can preferentially extract an image area not to be included in defect-free products in the target environment, or more specifically, extract an area having a high probability of a defect being included in the target environment. The estimation results from the two estimation models are combined together (specifically, the first estimation model narrows the range for detect detection, and the second estimation model determines whether any defect is included in the range) to optimize the accuracy of visual inspection. In other words, the accuracy of visual inspection is expected to be improved in a target environment although at least one of the estimation models has low estimation accuracy due to cost reduction in collecting training data.

However, products have various appearances. For example, a product having a patterned appearance (e.g., a wood grain pattern) may be easily determined to have a normal appearance or a defect by using a wider range, rather than by using a narrower range for determination. For example, a product having a simple appearance with a partial design may be easily determined to have a normal appearance or a defect by using a narrower range for determination. The estimation results from the two estimation models simply combined together without reflecting the appearance of a product may erroneously determine the normal appearance of the product, such as the contour and the pattern of the product, to have a defect and degrade the accuracy of visual inspection. In one aspect of the present invention, an attention area extracted by the first estimation model is integrated into at least one of feature maps generated by the second estimation model in a computational process performed with the second estimation model.

One or more embodiments of the present invention (hereafter, the present embodiment) will now be described with reference to the drawings. The embodiments described below are mere examples in any aspect. The embodiments may be variously modified or altered without departing from the scope of the present invention. More specifically, the present invention may be implemented as appropriate using the configuration specific to each embodiment. Although data used in the embodiments is described in a natural language, such data may be specifically defined using any computer-readable language, such as a pseudo language, commands, parameters, or a machine language.

1. Example Use

FIG. 1 is a schematic diagram of an example situation in one or more embodiments of the present invention. As shown in FIG. 1, a visual inspection system 100 according to the present embodiment includes a model generation apparatus 1 and an inspection apparatus 2.

The model generation apparatus 1 in the present embodiment is a computer for generating a first estimation model 5 and a second estimation model 6 usable for visual inspection. The first estimation model 5 is generated by training to extract, as an attention area, an image area having a probability of a defect being included based on first training data 30 including multiple first training images of defect-free products obtained in a target inspection environment. The second estimation model 6 is generated by training to determine the likelihood of a defect being included based on second training data 35 including multiple second training images of defects. Each estimation model (5 or 6) may be generated with any method that allows the estimation model (5 or 6) to be trained to perform the corresponding task based on the corresponding set of training data (30 or 35). The generation method may be selected as appropriate in each embodiment. For example, each estimation model (5 or 6) may be manually generated based on the corresponding set of training data (30 or 35). In the present embodiment, machine learning is used to generate each estimation model (5 or 6). Each estimation model (5 or 6) can thus be implemented easily.

More specifically, the model generation apparatus 1 obtains the first training data 30 including multiple acceptable-product images 31 of defect-free products obtained in the target inspection environment. The acceptable-product images 31 are examples of first training images. The model generation apparatus 1 trains, through machine learning using the first training data 30, the first estimation model 5 to extract, as an attention area, an area in a given image having a probability of a defect being included (specifically, an area including a feature derived from a defect). This generates the trained first estimation model 5 that has been trained to extract the attention area based on the first training data 30.

The model generation apparatus 1 also obtains the second training data 35 including multiple defect images 371 of defects. The defect images 371 are examples of second training images. The model generation apparatus 1 trains, through machine learning using the second training data 35, the second estimation model 6 to determine the likelihood of a defect being included in a given image (e.g., an image of a product). This generates the trained second estimation model 6 that has been trained to determine the likelihood of a defect being included based on the second training data 35.

The inspection apparatus 2 is a computer for performing visual inspection of products using the two generated estimation models (5 and 6). More specifically, the inspection apparatus 2 obtains a target image 221 of a target product R to be inspected. In the present embodiment, a camera S is located appropriately to capture an image of the target product R. The inspection apparatus 2 is connected to the camera S. The inspection apparatus 2 obtains the target image 221 from the camera S.

The inspection apparatus 2 uses the first estimation model 5 to extract the attention area from the obtained target image 221. The inspection apparatus 2 then uses the attention area extracted by the first estimation model 5 from the target image 221 to perform the computational process with the second estimation model 6. The computational process with the second estimation model 6 includes multiple projection processes including projecting the target image 221 into different spaces with lower dimensions to generate multiple feature maps 63 having different dimensions. Each projection process includes projecting the input data into a space with a lower dimension than the input data.

The multiple feature maps 63 with different dimensions resulting from the multiple projection processes may be generated as appropriate in each embodiment. For example, the computational process with the second estimation model 6 may include N projection processes that are performed sequentially in series (N is an integer greater than or equal to 2). More specifically, the first projection process may include projecting the target image 221 into a low-dimensional space. The second and subsequent projection processes (k-th projection process) may then include projecting the result of the previous projection process, or the (k−1)-th projection process, into a lower-dimensional space.

The attention area extracted by the first estimation model 5 is integrated into at least one of the feature maps 63 in the computational process performed with the second estimation model 6. The inspection apparatus 2 determines whether the target product R has a defect based on the computation result from the second estimation model 6. The inspection apparatus 2 then outputs information indicating the result of determining whether the target product R has a defect. In the manner described above, the inspection apparatus 2 according to the present embodiment performs visual inspection of products using the estimation models (5 and 6).

As described above, the visual inspection of the target product R in the present embodiment uses the first estimation model 5 generated based on multiple acceptable-product images 31 obtained in the target inspection environment, in addition to the second estimation model 6 that has been trained to determine the likelihood of a defect being included. The use of the first estimation model 5 designed specifically for the target environment is expected to improve the accuracy of visual inspection of the target product R. In the present embodiment, the attention area extracted by the first estimation model 5 is integrated into at least one of the feature maps 63 with different dimensions in the computational process performed with the second estimation model 6. The feature map to be integrated with the attention area extracted by the first estimation model 5 is determined to maximize the accuracy of determining whether the target product has a defect. The feature map to be integrated with the extracted attention area may be determined by the manufacturer of the inspection apparatus 2 through experiments conducted in advance to accommodate various appearances of the target products as appropriate, or through experiments in the target environment in which the inspection apparatus 2 is used to obtain highly accurate results of defect determination for a target product with a specific appearance. The computational process performed with the second estimation model 6 may include changing the dimension used in integrating the attention area extracted by the first estimation model 5. This allows dimensional adjustment of the range for determining the likelihood of a defect being included, thus allowing an integration process to be performed appropriately for the appearance of the target product R. Thus, the structure in the present embodiment is expected to improve the accuracy of visual inspection of the target product R in any appearance using the two estimation models (5 and 6).

In the example of FIG. 1, the model generation apparatus 1 and the inspection apparatus 2 are connected to each another with a network. The network may be selected as appropriate from, for example, the Internet, a wireless communication network, a mobile communication network, a telephone network, and a dedicated network. The model generation apparatus 1 and the inspection apparatus 2 communicate data between them in any other manner selected as appropriate in each embodiment. For example, the model generation apparatus 1 and the inspection apparatus 2 communicate data between them using a storage medium.

In the example of FIG. 1, the model generation apparatus 1 and the inspection apparatus 2 are separate computers. However, the visual inspection system 100 in the present embodiment may have any other structure as appropriate in each embodiment. For example, the model generation apparatus 1 and the inspection apparatus 2 may be integrated into a single computer. For example, at least one of the model generation apparatus 1 or the inspection apparatus 2 may include multiple computers.

The target product R may be, for example, any product transported on a production line, such as electronic devices, electronic components, automotive parts, chemicals, and food products. Electronic components may include, for example, substrates, chip capacitors, liquid crystals, and relay coils. Automotive parts may include, for example, connecting rods, shafts, engine blocks, power window switches, and panels. Chemicals may include, for example, packaged or unpackaged tablets. The target product R may be a final product resulting from the manufacturing processes, an intermediate product during the manufacturing processes, or an initial product before undergoing the manufacturing processes. The defects may be, for example, a scratch, a stain, a crack, a dent, a burr, uneven color, or foreign matter contamination.

2. Example Structure

Hardware Configuration
Model Generation Apparatus

Figure 2:
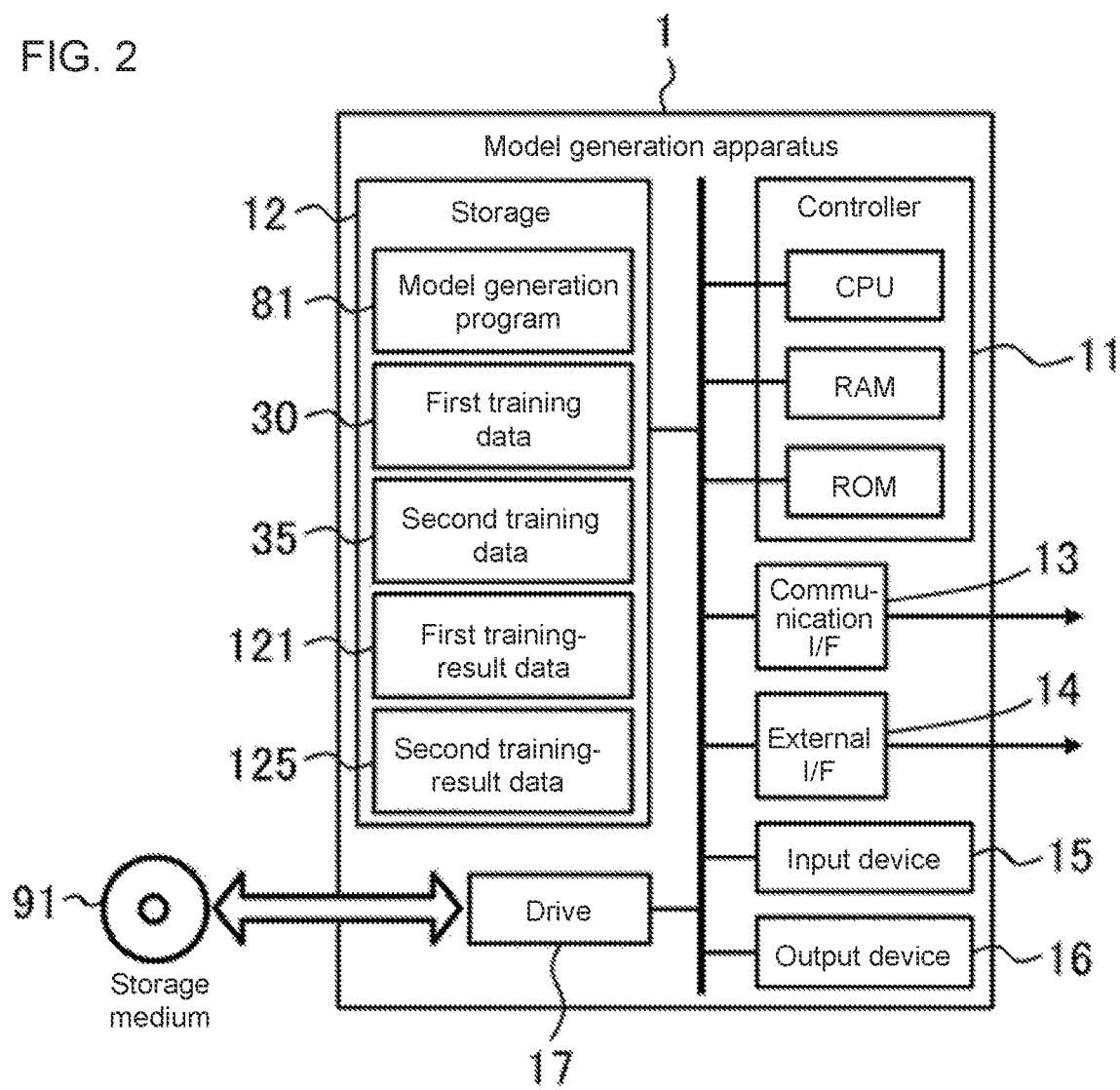
FIG. 2 is a schematic diagram illustrating a model generation apparatus in one or more embodiments that includes an example hardware configuration.

FIG. 2 is a schematic diagram of the model generation apparatus 1 in the present embodiment showing its example hardware configuration. As shown in FIG. 2, the model generation apparatus 1 in the present embodiment is a computer including a controller 11, a storage 12, a communication interface 13, an external interface 14, an input device 15, an output device 16, and a drive 17 that are electrically connected to one another. In FIG. 2, the communication interface and the external interface are abbreviated as a communication I/F and an external I/F.

The controller 11 includes, for example, a central processing unit (CPU) as a hardware processor, a random-access memory (RAM), and a read-only memory (ROM). The controller 11 performs information processing based on programs and various items of data. The storage 12, as an example of a memory, includes, for example, a hard disk drive or a solid-state drive. In the present embodiment, the storage 12 stores various items of information including a model generation program 81, the first training data 30, the second training data 35, first training-result data 121, and second training-result data 125.

The model generation program 81 causes the model generation apparatus 1 to perform information processing (FIGS. 6 and 7) for generating the estimation models (5 and 6) described later. The model generation program 81 includes a series of commands for the information processing. The first training data 30 is used to generate the first estimation model 5. The second training data 35 is used to generate the second estimation model 6. The first training-result data 121 represents information about the generated first estimation model 5. The second training-result data 125 represents information about the generated second estimation model 6. In the present embodiment, the training-result data (121 and 125) results from the model generation program 81 being executed. This will be described in detail later.

The communication interface 13 is, for example, a wired local area network (LAN) module or a wireless LAN module for wired or wireless communication through a network. The model generation apparatus 1 may use the communication interface 13 to communicate data with another information processing device through a network. The external interface 14 is an interface for connection to an external device and may be, for example, a universal serial bus (USB) port or a dedicated port. The types and the number of external interfaces 14 may be selected as appropriate. The model generation apparatus 1 may be connected to a camera for capturing training images with at least one of the communication interface 13 or the external interface 14.

The input device 15 includes, for example, a mouse and a keyboard. The output device 16 includes, for example, a display and a speaker. An operator such as a user may operate the model generation apparatus 1 using the input device 15 and the output device 16.

The drive 17 is, for example, a compact disc (CD) drive or a digital versatile disc (DVD) drive for reading programs or other information stored in a storage medium 91. The storage medium 91 stores programs or other information in an electrical, magnetic, optical, mechanical, or chemical manner to allow a computer or another device or machine to read the recorded programs or other information. At least one of the model generation program 81, the first training data 30, or the second training data 35 may be stored in the storage medium 91. The model generation apparatus 1 may obtain at least one of the model generation program 81, the first training data 30, or the second training data 35 from the storage medium 91. In FIG. 2, the storage medium 91 is a disc storage, such as a CD or a DVD. However, the storage medium 91 is not limited to a disc storage. One example of the storage medium other than a disc is a semiconductor memory such as a flash memory. The drive 17 may be of any type selected as appropriate for the type of the storage medium 91.

For the specific hardware configuration of the model generation apparatus 1, components may be eliminated, substituted, or added as appropriate in each embodiment. For example, the controller 11 may include multiple hardware processors. Each hardware processor may include a microprocessor, a field-programmable gate array (FPGA), a digital signal processor (DSP), or other processors. The storage 12 may be the RAM and the ROM included in the controller 11. At least one of the communication interface 13, the external interface 14, the input device 15, the output device 16, or the drive 17 may be eliminated. The model generation apparatus 1 may include multiple computers. In this case, each computer may have the same or a different hardware configuration. The model generation apparatus 1 may also be an information processor dedicated to a service to be provided, or may be a general-purpose server or a general-purpose personal computer (PC).

Inspection Apparatus

Figure 3:
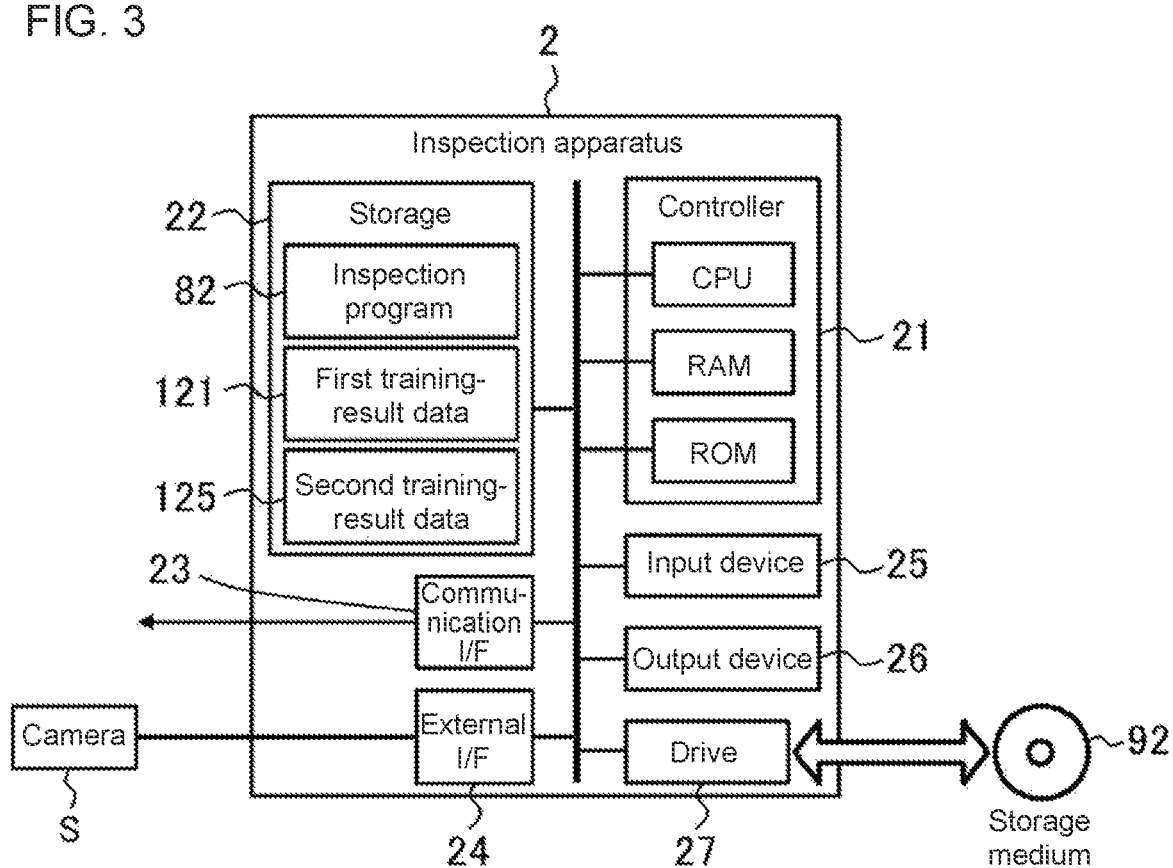
FIG. 3 is a schematic diagram illustrating an inspection apparatus according to one or more embodiments that includes an example hardware configuration.

FIG. 3 is a schematic diagram of the inspection apparatus 2 according to the present embodiment showing its example hardware configuration. As shown in FIG. 3, the inspection apparatus 2 according to the present embodiment is a computer including a controller 21, a storage 22, a communication interface 23, an external interface 24, an input device 25, an output device 26, and a drive 27 that are electrically connected to one another.

The components of the inspection apparatus 2 from the controller 21 to the drive 27 and a storage medium 92 may have the same structures as the components of the above model generation apparatus 1 from the controller 11 to the drive 17 and the storage medium 91. The controller 21 includes, for example, a CPU as a hardware processor, a RAM, and a ROM, and performs various information processing operations based on programs and data. The storage 22 includes, for example, a hard disk drive or a solid-state drive. In the present embodiment, the storage 22 stores various items of information including an inspection program 82, the first training-result data 121, and the second training-result data 125.

The inspection program 82 causes the inspection apparatus 2 to perform information processing (FIGS. 8 and 9) for visual inspection of the target product R (described later). The inspection program 82 includes a series of commands for the information processing. At least one of the inspection program 82, the first training-result data 121, or the second training-result data 125 may be stored in the storage medium 92. The inspection apparatus 2 may obtain a least one of the inspection program 82, the first training-result data 121, or the second training-result data 125 from the storage medium 92.

In the example of FIG. 3, the inspection apparatus 2 is connected to the camera S (imaging device) with the external interface 24. The inspection apparatus 2 can thus obtain target images 221 from the camera S. The inspection apparatus 2 may be connected to the camera S in any manner other than with the external interface 24. For a camera S including a communication interface, for example, the inspection apparatus 2 may be connected to the camera S with the communication interface 23. The camera S may be of any type selected as appropriate in each embodiment. The camera S may be, for example, a common RGB camera, a depth camera, or an infrared camera.

For the specific hardware configuration of the inspection apparatus 2, components may be eliminated, substituted, or added as appropriate in each embodiment. For example, the controller 21 may include multiple hardware processors. Each hardware processor may be a microprocessor, an FPGA, a DSP, or other processors. The storage 22 may be the RAM and the ROM included in the controller 21. At least one of the communication interface 23, the external interface 24, the input device 25, the output device 26, or the drive 27 may be eliminated. The inspection apparatus 2 may include multiple computers. In this case, each computer may have the same or a different hardware configuration. The inspection apparatus 2 may be an information processing apparatus dedicated to a service to be provided, or may be a general-purpose server, a general-purpose PC, or a programmable logic controller (PLC). The inspection apparatus 2 and the camera S may be integrated in a single image sensor.

Software Configuration
Model Generation Apparatus

Figure 4:
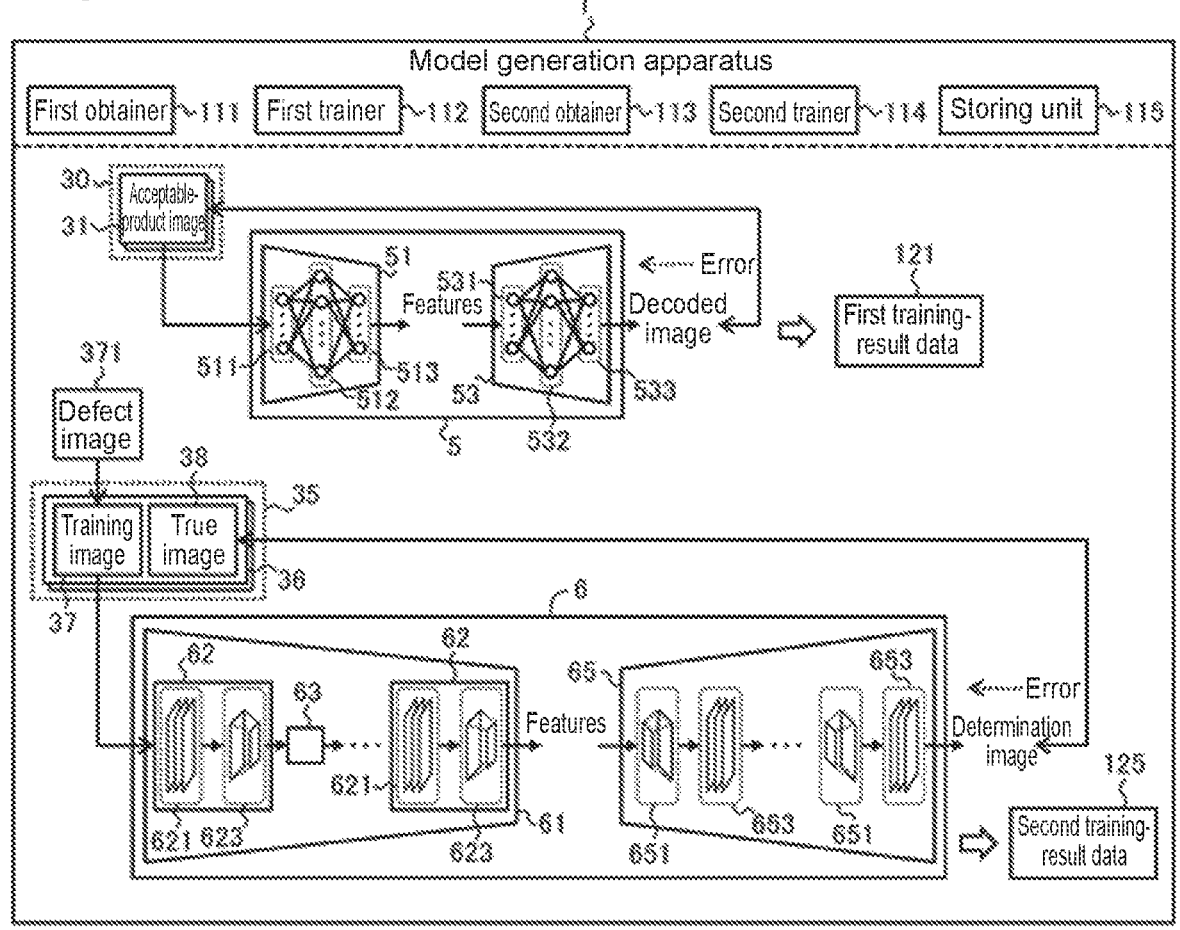
FIG. 4 is a schematic diagram illustrating a model generation apparatus in one or more embodiments that includes an example software configuration.

FIG. 4 is a schematic diagram of the model generation apparatus 1 in the present embodiment showing its example software configuration. The controller 11 in the model generation apparatus 1 loads the model generation program 81 stored in the storage 12 into the RAM. The CPU in the controller 11 then interprets and executes the commands included in the model generation program 81 loaded in the RAM to control each unit. The model generation apparatus 1 in the present embodiment thus operates as a computer including a first obtainer 111, a first trainer 112, a second obtainer 113, a second trainer 114, and a storing unit 115 as software modules as shown in FIG. 4. In other words, in the present embodiment, each software module in the model generation apparatus 1 is implemented by the controller 11 (CPU).

The first obtainer 111 obtains the first training data 30 including multiple acceptable-product images 31. The first trainer 112 trains the first estimation model 5 through machine learning using the first training data 30. The second obtainer 113 obtains the second training data 35 including multiple defect images 371. The second trainer 114 trains the second estimation model 6 through machine learning using the second training data 35. The storing unit 115 generates information about the trained first estimation model 5 generated through machine learning as the first training-result data 121. Similarly, the storing unit 115 generates information about the trained second estimation model 6 generated through machine learning as the second training-result data 125. The storing unit 115 then stores the generated training-result data (121 and 125) into a predetermined storage area.

Example Structure of Each Model and Example Machine Learning Method

Each estimation model (5 or 6) may have any structure that allows implementation of the above computational process. The structure may be determined as appropriate in each embodiment. The first estimation model 5 may be designed to extract an image area having a probability of a defect being included. The second estimation model 6 may be designed to determine the likelihood of a defect being included after generating multiple feature maps 63 with different dimensions through multiple projection processes in the computational process.

As shown in FIG. 4, in the present embodiment, the first estimation model 5 includes an encoder 51 that converts a given image (input image) into features and a decoder 53 that decodes the image from the features. The second estimation model 6 includes an encoder 61 that converts a given image (input image) into features and a decoder 65 that decodes the image from the features. The image decoded by the decoder 65 indicates, for each pixel, the likelihood of a defect being included. More specifically, each pixel in the decoded image shows information about the likelihood of an object captured at each pixel being a defect. The encoder 61 includes multiple coding units 62 connected in series sequentially from the input end. Each coding unit 62 converts input data into a feature map 63 with a lower dimension than the input data.

In the present embodiment, each estimation model (5 or 6) that has been trained to perform the corresponding task described above is generated through machine learning. Each estimation model (5 or 6) is thus a machine learning model with computational parameters adjustable through machine learning. The structure and the type of the machine learning model may be selected as appropriate in each embodiment. In the present embodiment, each estimation model (5 or 6) is a neural network. More specifically, each of the encoder 51 and the decoder 53 in the first estimation model 5 is a fully connected neural network. The encoder 61 in the second estimation model 6 is a convolutional neural network. This facilitates implementation of the estimation models (5 and 6).

(1) First Estimation Model

The encoder 51 and the decoder 53 in the first estimation model 5 each include an input layer (511 or 531), an intermediate (hidden) layer (512 or 532), and an output layer (513 or 533). In the example of FIG. 4, the encoder 51 and the decoder 53 each include three layers, but may include any number of layers as appropriate. For example, at least one of the encoder 51 or the decoder 53 may have two or more intermediate layers.

In the present embodiment, the input layer 511 of the encoder 51 receives an input image such as a target image 221. The output layer 513 outputs features calculated based on the input image. The input layer 531 of the decoder 53 receives input features calculated by the encoder 51. The output layer 533 outputs an image decoded based on the input features (decoded image). The encoder 51 and the decoder 53 may input and output information in any other form that allows implementation of the estimation process described above. For example, each input layer (511 or 531) may further receive input information other than the information described above. Each output layer (513 or 533) may further output information other than the information described above.

Each layer (511, 512, 513, 531, 532, or 533) includes one or more neurons (nodes). Each layer (511, 512, 513, 531, 532, or 533) may include any number of neurons selected as appropriate in each embodiment. The input layer (511 or 531) may be determined as appropriate for, for example, input data such as the input images and the features and their formats. The output layer (513 or 533) may be determined as appropriate for, for example, output data such as the features and the estimation results (e.g., decoded image) and their formats. In the example of FIG. 4, the neurons included in each layer (511, 512, 513, 531, 532, or 533) are connected to all the neurons in the adjacent layers. The neurons may be connected in any other manner determined as appropriate in each embodiment. For example, each neuron may be connected to a particular neuron in an adjacent layer or to a neuron in a layer other than an adjacent layer.

Each layer (511, 512, 513, 531, 532, or 533) has a weight defined for its connection (connection weight). Each neuron has a preset threshold. An output of each neuron is determined typically depending on whether the sum of the product of each input and the corresponding weight exceeds the threshold. The threshold may be expressed using an activation function. In this case, the sum of the product of each input and the corresponding weight is input into the activation function, and the activation function is computed to determine the output of each neuron. The type of activation function may be selected as appropriate. The connection weight between neurons included in each layer (511, 512, 513, 531, 532, or 533) and the threshold of each neuron are examples of computational parameters used in the computational process performed by each of the encoder 51 and the decoder 53.

In training the first estimation model 5 through machine learning, the first trainer 112 uses acceptable-product images 31 as training data and ground truth data. More specifically, the first trainer 112 inputs an acceptable-product image 31 into the input layer 511 of the encoder 51 and performs a forward propagation computation with the encoder 51 and the decoder 53. After the computational process, the first trainer 112 obtains the generated decoded image from the output layer 533 of the decoder 53. The first trainer 112 calculates the error (reconstruction error) between the obtained decoded image and the input acceptable-product image 31. The first trainer 112 iteratively adjusts the values of the computational parameters used by the encoder 51 and the decoder 53 to reduce the error calculated for each acceptable-product image 31. This generates the trained first estimation model 5.

The trained first estimation model 5 in the present embodiment can accurately reconstruct the acceptable-product images 31 used in the machine learning as well as images similar to the acceptable-product images 31, or more specifically, external images of defect-free products (acceptable products) obtained in a target inspection environment. In contrast, the reconstruction accuracy is lower for images other than the above images such as images of defective products. In other words, the area with a greater reconstruction error has a high probability of a defect being included. The first estimation model 5 in the present embodiment can thus learn to extract, through the above machine learning, an image area having a probability of a defect being included based on the reconstruction error.

The storing unit 115 generates the first training-result data 121 used to reproduce the trained first estimation model 5 generated through the above machine learning. The first training-result data 121 may have any structure that allows reproduction of the trained first estimation model 5. The structure may be determined as appropriate in each embodiment. For example, the first training-result data 121 may include information indicating the values of the computational parameters for the first estimation model 5 obtained through adjustment in the above machine learning. In some embodiments, the first training-result data 121 may further include information indicating the structure of the first estimation model 5 (the encoder 51 and the decoder 53). The structure may be defined using, for example, the number of layers from an input layer to an output layer in a neural network, the types of layers, the number of neurons included in each layer, and the connection relationship between neurons in adjacent layers. The storing unit 115 stores the generated first training-result data 121 into a predetermined storage area.

(2) Second Estimation Model

The encoder 61 in the second estimation model 6 includes the multiple coding units 62. Each coding unit 62 includes one or more convolutional layers 621 and one or more pooling layers 623.

Each convolutional layer 621 performs a convolutional computation for a given data. The convolutional computation corresponds to calculating a correlation between a given data and a predetermined filter. For example, an input image undergoes image convolution that detects a grayscale pattern similar to the grayscale pattern of the filter. Each pooling layer 623 performs a pooling process. A piece of a given data undergoes the pooling process that selectively discards information at positions highly responsive to the filter to achieve invariable response to slight positional changes of the features occurring in the data. For example, the pooling layer may extract the greatest value in the filter and delete the other values. Each coding unit 62 in the present embodiment converts the input data into a lower-dimensional feature map 63 with the convolutional layers 621 and the pooling layers 623.

Each coding unit 62 may include any number of convolutional layers 621 and any number of pooling layers 623 determined as appropriate. In the example of FIG. 4, the encoder 61 includes no components other than the coding units 62. The coding units 62 are connected in series. Each coding unit 62 includes the convolutional layers 621 closer to the input end than the pooling layers 623. The convolutional layer 621 in the coding unit 62 closest to the input end serves as the input layer of the encoder 61. The pooling layer 623 in the coding unit 62 closest to the output end serves as the output layer of the encoder 61.

The encoder 61 and each coding unit 62 may have any other structures. The convolutional layers 621 and the pooling layers 623 may be arranged and connected as appropriate in each embodiment. For example, for each coding unit 62 including multiple convolutional layers 621 and multiple pooling layers 623, the convolutional layers 621 and the pooling layers 623 may be arranged alternately. In some embodiments, multiple convolutional layers 621 are arranged consecutively before one or more pooling layers 623 are arranged. The encoder 61 may include components other than the coding units 62. The encoder 61 may include other layers such as normalized layers, dropout layers, and fully-connected layers. Such other layers may be located in the coding units 62.

The decoder 65 includes one or more unpooling layers 651 and one or more inverse convolutional layers 653. The unpooling layers 651 perform the inverse operation of the above pooling process. The inverse convolutional layers 653 perform the inverse operation of the above convolution process. The decoder 65 includes any number of unpooling layers 651 and any number of inverse convolutional layers 653 determined as appropriate. In the example in FIG. 4, the unpooling layers 651 and the inverse convolutional layers 653 are arranged alternately. The unpooling layer 651 closest to the input end serves as the input layer of the decoder 65. The inverse convolutional layer 653 closest to the output end serves as the output layer of the decoder 65. The decoder 65 may have any other structure, similarly to the encoder 61. The unpooling layers 651 and the inverse convolutional layers 653 may be arranged and connected as appropriate in each embodiment. The decoder 65 may include layers other than the unpooling layers 651 and the inverse convolutional layers 653.

In the present embodiment, the encoder 61 receives, at the input layer, an input image such as a target image 221 and outputs, from the output layer, features (feature map) calculated based on the input image. The decoder 65 receives, at the input layer, the features calculated by the encoder 61 and outputs, from the output layer, an image (determination image) decoded based on the input features indicating, for each pixel, the estimated likelihood of a defect being included. The encoder 61 and the decoder 65 may input and output information in any other form that allows implementation of the estimation process described above. For example, each input layer may further receive input information other than the information described above. Each output layer may further output information other than the information described above.

The convolutional layers 621 include neurons (nodes) corresponding to the convolutional computation. The neurons (nodes) are connected to an output area of either the input layer or a layer preceding (or closer to the input end than) the convolutional layer 621. Similarly, the inverse convolutional layers 653 also include neurons corresponding to the inverse convolutional computation. Each layer (621 or 653) may include any number of neurons selected as appropriate in each embodiment. Each neuron in the convolutional layers 621 may further be connected to a neuron in a layer other than an adjacent layer (e.g., the corresponding inverse convolutional layer 653 in the decoder 65), such as with U-Net.

Each of the convolutional layers 621 and the inverse convolutional layers 653 has a weight (connection weight) defined for its connection, similarly to each layer in the first estimation model 5. Each neuron has a preset threshold. The threshold may be expressed using an activation function. The connection weights between neurons included in the convolutional layers 621 and the inverse convolutional layers 653 and the thresholds for the neurons are examples of computational parameters used in the computational process performed by the encoder 61 and the decoder 65.

In the present embodiment, the second obtainer 113 obtains the second training data 35 usable in the training of the second estimation model 6 with the above structure through machine learning. In one example, the second training data 35 includes multiple training data sets 36. Each training data set 36 includes a pair of a training image 37 and a true image 38. In the machine learning, the training images 37 are used as training data and the true images 38 are used as ground truth data. At least one of the training images 37 is a defect image 371. The other training images 37 may be images of objects without defects. For a training image 37 of a defect, the corresponding true image 38 shows the range of the defect.

In the present embodiment, the second trainer 114 uses such second learning data 35 to train the second estimation model 6 through machine learning. More specifically, the second trainer 114 inputs the training image 37 included in each training data set 36 into the input layer of the encoder 61 and performs a forward propagation computation with the encoder 61 and the decoder 65. After the computational process, the second trainer 114 obtains the generated determination image from the output layer of the decoder 65. The second trainer 114 calculates the error between the obtained determination image and the corresponding true image 38. The second trainer 114 iteratively adjusts the values of the computational parameters for the encoder 61 and the decoder 65 to reduce the error calculated for each training data set 36. This generates the trained second estimation model 6. The ground truth data may have any structure selected as appropriate for the output format of the second estimation model 6. For example, for a second estimation model 6 outputting the result of identifying the type of defect, the ground truth data may include information indicating the type of defect in addition to or instead of the true image 38.

The storing unit 115 generates the second training-result data 125 used to reproduce the trained second estimation model 6 generated through the above machine learning. The second training-result data 125 may have any structure that allows reproduction of the trained second estimation model 6, similarly to the first training-result data 121. The structure may be determined as appropriate in each embodiment. For example, the second training-result data 125 may include information indicating the values of the computational parameters for the second estimation model 6 obtained through adjustment in the above machine learning. In some embodiments, the second training-result data 125 may further include information indicating the structure of the second estimation model 6 (the encoder 61 and the decoder 65). The storing unit 115 stores the generated second training-result data 125 into a predetermined storage area.

Inspection Apparatus

Figure 5:
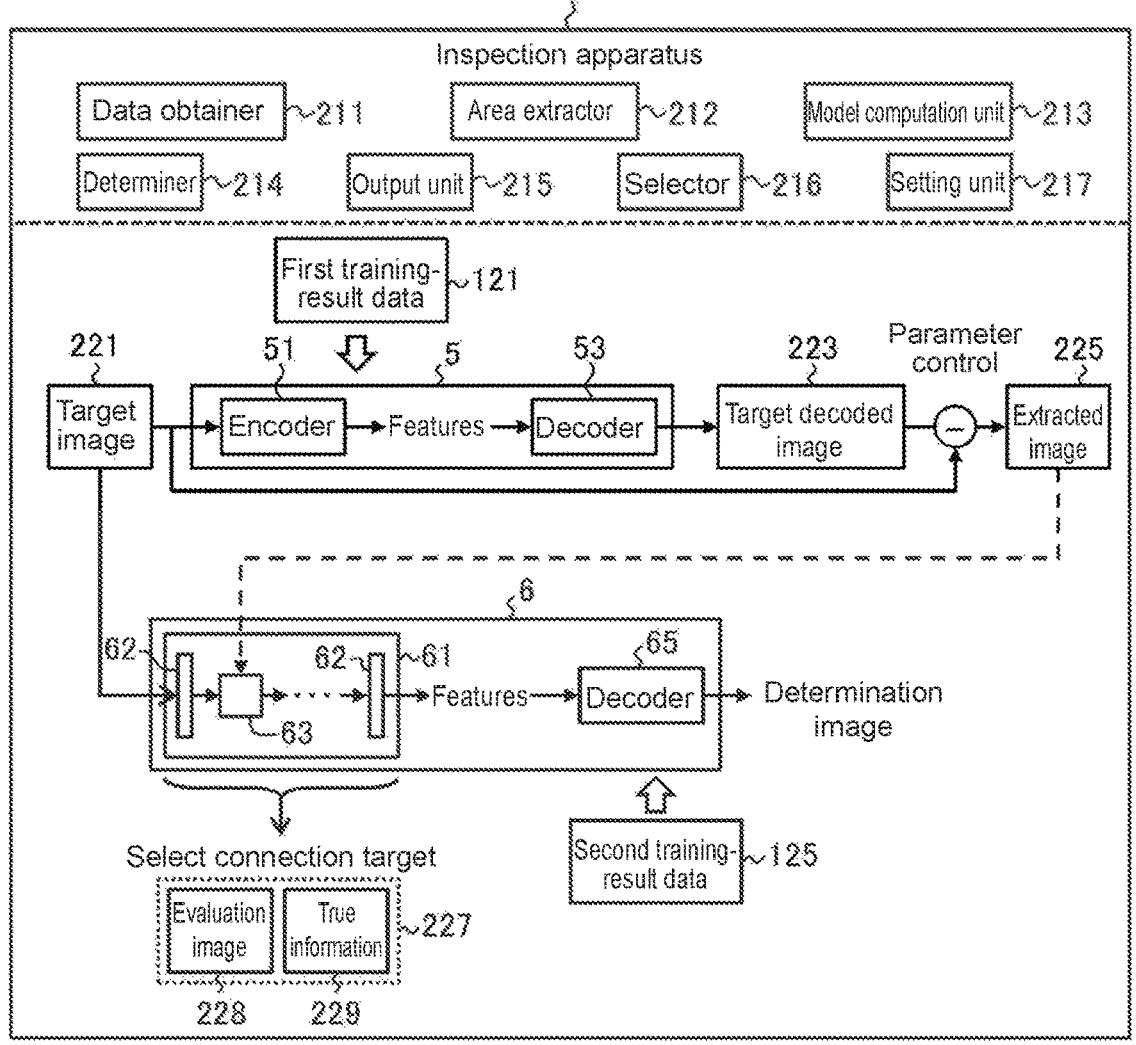
FIG. 5 is a schematic diagram illustrating an inspection apparatus according to one or more embodiments that includes an example software configuration.

FIG. 5 is a schematic diagram of the inspection apparatus 2 according to the present embodiment showing its example software configuration. The controller 21 in the inspection apparatus 2 loads the inspection program 82 stored in the storage 22 into the RAM. The CPU in the controller 21 then interprets and executes the commands included in the inspection program 82 loaded in the RAM to control each unit. As shown in FIG. 5, the inspection apparatus 2 according to the present embodiment thus operates as a computer including a data obtainer 211, an area extractor 212, a model computation unit 213, a determiner 214, an output unit 215, a selector 216, and a setting unit 217 as software modules. In other words, in the present embodiment, each software module in the inspection apparatus 2 is implemented by the controller 21 (CPU) in the same manner as in the model generation apparatus 1.

The data obtainer 211 obtains a target image 221 of a target product R to be inspected. The area extractor 212 stores the first training-result data 121 and thus includes the first estimation model 5. The area extractor 212 extracts an attention area from the target image 221 using the first estimation model 5. In the present embodiment, the area extractor 212 inputs the target image 221 into the encoder 51 and performs a forward propagation computation with the encoder 51 and the decoder 53. The area extractor 212 thus generates a target decoded image 223 for the target image 221 with the encoder 51 and the decoder 53. The area extractor 212 calculates a difference in areas between the generated target decoded image 223 and the target image 221 and generates an extracted image 225 based on the calculated difference area. The extracted image 225 is an example of an extracted attention area. In the present embodiment, the extracted image 225 may be generated as an attention map that indicates, for each pixel, a probability of a defect being included. The feature maps 63 and the attention map both are image data. The extracted attention area generated as an attention map can thus be integrated easily into a feature map 63.

The model computation unit 213 stores the second training-result data 125 and thus includes the second estimation model 6. The model computation unit 213 uses the extracted attention area (specifically, the attention area extracted from the target image 221) to perform the computational process with the second estimation model 6. The computational process with the second estimation model 6 includes multiple projection processes including projecting the target image 221 into different spaces with lower dimensions to generate multiple feature maps 63 with different dimensions. The extracted attention area is integrated into at least one of the feature maps 63 in the computational process with the second estimation model 6.

In the present embodiment, the model computation unit 213 inputs the target image 221 into the encoder 61 and performs a forward propagation computation with the encoder 61 and the decoder 65. In the computational process, multiple projection processes performed on the target image 221 include computational processes performed on the coding units 62 sequentially from the coding unit 62 on the input end. The extracted attention area is integrated into a feature map 63 generated by at least one of the coding units 62 in the computational process with the second estimation model 6. With one example integration method, the model computation unit 213 may resize the extracted image 225 appropriately for the size of the target feature map 63 into which the extracted image 225 is integrated. The model computation unit 213 may then multiply the resized extracted image 225 by the target feature map 63 to integrate the extracted attention area into the target feature map 63. The resizing process may be eliminated as appropriate.

The determiner 214 determines whether the target product R has a defect based on the computation result from the second estimation model 6. The output unit 215 outputs information indicating the result of determining whether the target product R has a defect.

The selector 216 selects at least one target coding unit from the coding units 62. The extracted attention area may be integrated into a feature map 63 generated by the at least one target coding unit selected in the computational process with the second estimation model 6. The selection of the target coding unit can optimize the accuracy of visual inspection performed with the two estimation models (5 and 6). The selection of the target coding unit may use an evaluation data set 227 including a pair of an evaluation image 228 and true information 229.

The setting unit 217 sets the value of a parameter that defines the degree by which an image area including a defect is extracted as an attention area. The area extractor 212 may extract an attention area in accordance with the set parameter value. This structure allows adjustment of the degree by which the estimation result from the first estimation model 5 is reflected, thus optimizing the accuracy of visual inspection performed with the two estimation models (5 and 6) in the target environment. In the present embodiment, the difference in areas between the target image 221 and the target decoded image 223 is calculated to extract the attention area. The parameter may thus include an expansion parameter that defines the degree by which the difference area is expanded. The area extractor 212 may extract the attention area (in the present embodiment, the extracted image 225) by expanding the calculated difference area in accordance with the value of the set expansion parameter.

Others

Each software module in the model generation apparatus 1 and the inspection apparatus 2 will be described in detail in the operation examples below.

In the present embodiment, each software module in the model generation apparatus 1 and the inspection apparatus 2 is implemented by a general-purpose CPU. However, some or all of the software modules may be implemented by one or more dedicated processors. In other words, each of the modules may be implemented as a hardware module. For the software configurations of the model generation apparatus 1 and the inspection apparatus 2, software modules may be eliminated, substituted, or added as appropriate in each embodiment.

3. Operation Example

Model Generation Apparatus
(1) Generating First Estimation Model

Figure 6:
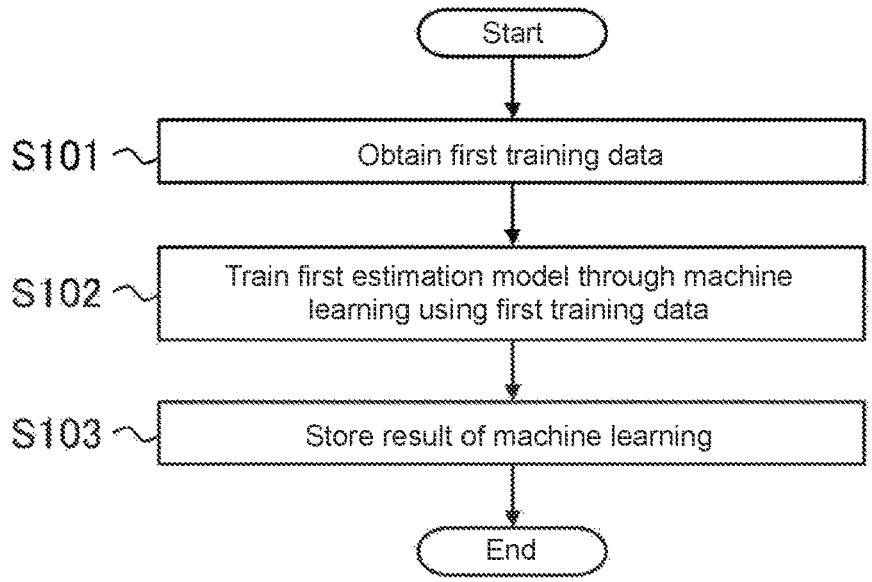
FIG. 6 is a flowchart illustrating an example procedure for generating a first estimation model performed by a model generation apparatus in one or more embodiments.

FIG. 6 is a flowchart of an example procedure for generating (through machine learning) the first estimation model 5 performed by the first model generation apparatus 1 in the present embodiment. The procedure for generating the first estimation model 5 described below is a mere example, and each of its steps may be modified in any possible manner. In the procedure for generating the first estimation model 5 described below, steps may be eliminated, substituted, or added as appropriate in each embodiment.

Step S101

In step S101, the controller 11 operates as the first obtainer 111 and obtains first training data 30 including multiple acceptable-product images 31.

The acceptable-product images 31 included in the first training data 30 may be generated as appropriate. For example, the camera S or a camera of the same type as the camera S is prepared. Products of the same type as the target product R and free of defects are prepared in the target inspection environment. The prepared products are then imaged with the camera. In this manner, acceptable-product images 31 can be obtained. The acceptable-product images 31 may be unprocessed images obtained with the camera. In some embodiments, the acceptable-product images 31 may be images generated by processing the images obtained with the camera.

The first training data 30 may be automatically generated through a computer operation or at least partially manually generated through an operation performed by an operator. The first training data 30 may be generated by the model generation apparatus 1 or by a computer other than the model generation apparatus 1. When the model generation apparatus 1 generates the first training data 30, the controller 11 performs the generation process described above automatically or in response to a manual operation performed by an operator with the input device 15 to obtain the first training data 30. When another computer generates the first training data 30, the controller 11 may obtain the first training data 30 generated by the other computer through, for example, a network or the storage medium 91. Some of the acceptable-product images 31 in the first training data 30 may be generated by the model generation apparatus 1, and the remaining of the acceptable-product images 31 may be generated by one or more other computers.

The first training data 30 may include any number of acceptable-product images 31 determined as appropriate in each embodiment. Although the first training data 30 may include acceptable-product images 31 alone in some embodiments, the first training data 30 may include images of defective products as training images in other embodiments. After obtaining the first training data 30, the controller 11 advances the processing to subsequent step S102.

Step S102

In step S102, the controller 11 operates as the first trainer 112 to train the first estimation model 5 through machine learning using the obtained first training data 30. The controller 11 trains, through the machine learning, the first estimation model 5 to extract, as an attention area, an image area having a probability of a defect being included. All of the obtained acceptable-product images 31 may not be used in machine learning of the first estimation model 5, but acceptable-product images 31 may be selectively used in the machine learning.

In an example process of the machine learning, the controller 11 first prepares neural networks to be the encoder 51 and the decoder 53 included in the first estimation model 5. The architecture of each neural network (e.g., the number of layers, the types of layers, the number of neurons in each layer, the connection relationship between neurons in adjacent layers), the default values of the connection weights between neurons, and the default threshold of each neuron may be preset using a template or may be input by an operator. For relearning, the controller 11 may prepare the encoder 51 and the decoder 53 based on the training result data obtained through past machine learning.

The controller 11 then trains the encoder 51 and the decoder 53 using the acceptable-product images 31 in the first training data 30 as training data (input data) and ground truth data (supervisory signal or label). The training process may include, for example, stochastic gradient descent and mini-batch gradient descent.

In one example of the training process, the controller 11 inputs each acceptable-product image 31 into the encoder 51 and performs a forward propagation computation with the encoder 51 and the decoder 53. More specifically, the controller 11 inputs each acceptable-product image 31 into the input layer 511 of the encoder 51 and performs the computational process such as determining neuronal firing in each of the layers sequentially from the layer on the input end. After the computational process, the controller 11 obtains the decoded image generated based on each acceptable-product image 31 from the output layer 533 of the decoder 53. The controller 11 calculates the error between the obtained decoded image and the corresponding acceptable-product image 31. The error (loss) may be calculated with a loss function. The loss function used for calculating such an error may be of any type selected as appropriate in each embodiment.

Subsequently, the controller 11 calculates the gradient of the calculated error. The controller 11 uses backpropagation to calculate an error in the value of each computational parameter (e.g., the connection weight between neurons and the threshold of each neuron) for the encoder 51 and the decoder 53 using the calculated gradient of the error from the layer on the output end. The controller 11 updates the value of each computational parameter for the encoder 51 and the decoder 53 based on the calculated error. The values of the computational parameters may be updated by the frequency adjusted based on the learning rate. The learning rate may be provided with an indication by an operator or provided as a value preset in a program.

The controller 11 adjusts, for each acceptable-product image 31, the value of each computational parameter for the encoder 51 and the decoder 53 with the above series of updating processing steps to reduce the sum of the calculated errors. For example, until the predetermined condition is satisfied, such as an operation being performed a predetermined number of times or the sum of calculated errors falling below a threshold, the controller 11 may iteratively adjust the value of each computational parameter for the encoder 51 and the decoder 53 with the above series of updating processing steps.

The controller 11 can thus generate, through the machine learning, the trained first estimation model 5 that has been trained to extract, as an attention area, the image area having the probability of a defect being included. More specifically, the structure in the present embodiment generates the trained first estimation model 5 that reconstructs the appearances of defect-free products in the target embodiment with high accuracy and reconstructs the appearances of other products with low accuracy. After training the first estimation model 5 through machine learning, the controller 11 advances the processing to subsequent step S103.

Step S103

In step S103, the controller 11 operates as the storing unit 115 and generates information about the trained first estimation model 5 (the encoder 51 and the decoder 53) generated through machine learning as the first training-result data 121. The controller 11 then stores the generated first training-result data 121 in a predetermined storage area.

The predetermined storage area may be, for example, the RAM in the controller 11, the storage 12, an external storage, a storage medium, or a combination of these. The storage medium is, for example, a CD or a DVD. The controller 11 may store the first training-result data 121 into the storage medium through the drive 17. The external storage may be, for example, a data server, such as a network attached storage (NAS). In this case, the controller 11 may use the communication interface 13 to store the first training-result data 121 into a data server through a network. The external storage may be connected to the model generation apparatus 1 with the external interface 14.

After storing the first training-result data 121, the controller 11 ends the procedure for generating the first estimation model 5 in the present operation example.

The generated first training-result data 121 may be provided to the inspection apparatus 2 at any selected time. For example, the controller 11 may transfer the first training-result data 121 to the inspection apparatus 2 in step S103 or in a step separate from step S103. The inspection apparatus 2 may receive the transferred data to obtain the first training-result data 121. In another example, the inspection apparatus 2 may use the communication interface 23 to access the model generation apparatus 1 or a data server through a network and obtain the first training-result data 121. In still another example, the inspection apparatus 2 may obtain the first training-result data 121 through the storage medium 92. In still another example, the inspection apparatus 2 may prestore the first training-result data 121.

The controller 11 may further update or newly generate the first training-result data 121 by regularly or irregularly iterating the processing in steps S101 to S103 above. During the iterative processing, at least part of the first training data 30 used for the machine learning may undergo, for example, changes, modifications, additions, and deletions as appropriate. The controller 11 may provide the updated or newly generated first training-result data 121 to the inspection apparatus 2 in any manner to update the first training-result data 121 stored by the inspection apparatus 2.

(2) Generating Second Estimation Model

Figure 7:
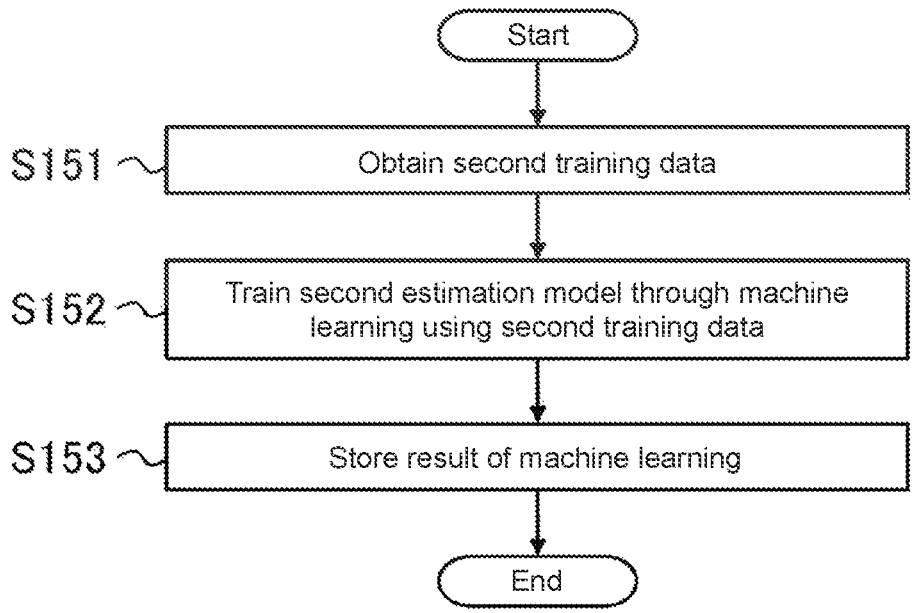
FIG. 7 is a flowchart illustrating an example procedure for generating a second estimation model performed by a model generation apparatus according to one or more embodiments.

FIG. 7 is a flowchart of an example procedure for generating the second estimation model 6 (through machine learning) performed by the model generation apparatus 1 in the present embodiment. The procedure for generating the second estimation model 6 described below is a mere example, and each of its steps may be modified in any possible manner. In the procedure for generating the second estimation model 6 described below, steps may be eliminated, substituted, or added as appropriate in each embodiment.

Step S151

In step S151, the controller 11 operates as the second obtainer 113 and obtains the second training data 35 including multiple defect images 371. In the present embodiment, the second training data 35 includes multiple training data sets 36. Each training data set 36 includes a pair of a training image 37 and a true image 38. At least one of the training images 37 is a defect image 371.

The training data sets 36 included in the second training data 35 may be generated as appropriate. In the same manner as with the first training data 30, the camera S or a camera of the same type as the camera S is prepared, for example. Products with defects are also prepared. The prepared products are then imaged with the camera. This can generate the defect images 371 usable as the training images 37. Image processing may be used to extract the defects alone in the obtained images. In other words, an image of a defect alone may be generated as the defect image 371. The defect image 371 may or may not include the appearance of the product. An image of an object without any defect may also be generated as the training image 37. This training image 37 may be generated as appropriate by any image processing. In some embodiments, defect-free products may be imaged with a camera to generate the training images 37 of the products without detects. The training images 37 may be unprocessed images obtained with the camera, or may be images generated by processing the images obtained with the camera. The generated training images 37 each are associated with the corresponding true image 38 indicating the range of the defect. The true images 38 may be generated from the training images 37 to have the same format as determination images. In some embodiments, the true images 38 may be generated manually by an operator. Each training data set 36 can be generated through this process.

The second training data 35 may be automatically generated through a computer operation or at least partially manually generated through an operation performed by an operator. The second training data 35 may be generated by the model generation apparatus 1 or by a computer other than the model generation apparatus 1. When the model generation apparatus 1 generates the second training data 35, the controller 11 may perform the generation process described above automatically or in response to a manual operation performed by an operator with the input device 15 to obtain the second training data 35. When another computer generates the second training data 35, the controller 11 may obtain the second training data 35 generated by the other computer through, for example, a network or the storage medium 91. Some of the training data sets 36 in the second training data 35 may be generated by the model generation apparatus 1, and the remaining sets of the training data 36 may be generated by one or more other computers.

The second training data 35 may include any number of training data sets 36 determined as appropriate in each embodiment. After obtaining the second training data 35, the controller 11 advances the processing to subsequent step S152.

Step S152

In step S152, the controller 11 operates as the second trainer 114 and trains the second estimation model 6 through machine learning using the obtained second training data 35. The controller 11 trains the second estimation model 6 through the machine learning to determine the likelihood of a defect being included in a given image. All of the obtained training data sets 36 may not be used in machine learning of the second estimation model 6, but training data sets 36 may be selectively used in the machine learning.

In an example process of the machine learning, the controller 11 first prepares neural networks to be the encoder 61 and the decoder 65 included in the second estimation model 6 to undergo machine learning. The architecture of each neural network, the default values of the connection weights between neurons, and the default threshold of each neuron may be preset using a template or may be input by an operator. For relearning, the controller 11 may prepare the encoder 61 and the decoder 65 based on the training result data obtained through past machine learning.

The controller 11 then trains the encoder 61 and the decoder 65 using the training image 37 in each training data set 36 as training data and the corresponding true images 38 as ground truth data. The training process may include, for example, stochastic gradient descent and mini-batch gradient descent.

In an example of the training process, the controller 11 inputs the training image 37 in each training data set 36 into the encoder 61 and performs a forward propagation computation with the encoder 61 and the decoder 65. More specifically, the controller 11 inputs each training image 37 into the input layer of the encoder 61 and performs a computational process such as determining neuronal firing in each of the layers sequentially from the layer on the input end. After the computational process, the controller 11 obtains the determination image generated based on each training image 37 from the output layer of the decoder 65. The controller 11 calculates an error between the obtained determination image and the corresponding true image 38 for each training data set 36. The error (loss) may be calculated with any loss function. For example, the error between the determination image and the true image 38 may be calculated by Intersection over Union (IoU).

Subsequently, the controller 11 calculates the gradient of the calculated error. The controller 11 uses backpropagation to calculate an error in the value of each computational parameter for the encoder 61 and the decoder 65 using the calculated gradient of the error from the layer on the output end. The controller 11 updates the value of each computational parameter for the encoder 61 and the decoder 65 based on the calculated error. As with the first estimation model 5, the value of each computational parameter may be updated by the frequency adjusted based on the learning rate.

The controller 11 adjusts, for each training data set 36, the value of each computational parameter for the encoder 61 and the decoder 65 with the above series of updating processing steps to reduce the sum of the calculated errors. In the same manner as with the first estimation model 5, the controller 11 may iteratively adjust the value of each computational parameter for the encoder 61 and the decoder 65 with the above series of processing steps until the predetermined condition is satisfied.

The controller 11 can thus generate, through the machine learning, the trained second estimation model 6 that has been trained to determine the likelihood of a defect being included in a given image. After training the second estimation model 6 through the machine learning, the controller 11 advances the processing to subsequent step S153.

Step S153

In step S153, the controller 11 operates as the storing unit 115 and generates information about the trained second estimation model 6 (the encoder 61 and the decoder 65) generated through machine learning as the second training-result data 125. The controller 11 then stores the generated second training-result data 125 into a predetermined storage area. As in step S103, the predetermined storage area may be, for example, the RAM in the controller 11, the storage 12, an external storage, a storage medium, or a combination of these. The second training-result data 125 may be stored into the same storage as the first training-result data 121 or may be stored into a different storage.

After storing the second training-result data 125, the controller 11 ends the procedure for generating the second estimation model 6 in the present operation example. Similarly to the first training-result data 121, the second training-result data 125 may be provided to the inspection apparatus 2 at any selected time. The processing in steps S151 to S153 may be iterated regularly or irregularly. During the iterative processing, at least part of the second training data 35 may undergo changes, modifications, additions, and deletions as appropriate. The second training-result data 125 updated or newly generated through the iterative processing may be provided to the inspection apparatus 2 in any manner to update the second training-result data 125 stored by the inspection apparatus 2.

Inspection Apparatus (1) Selecting Target Coding Unit

Figure 8:
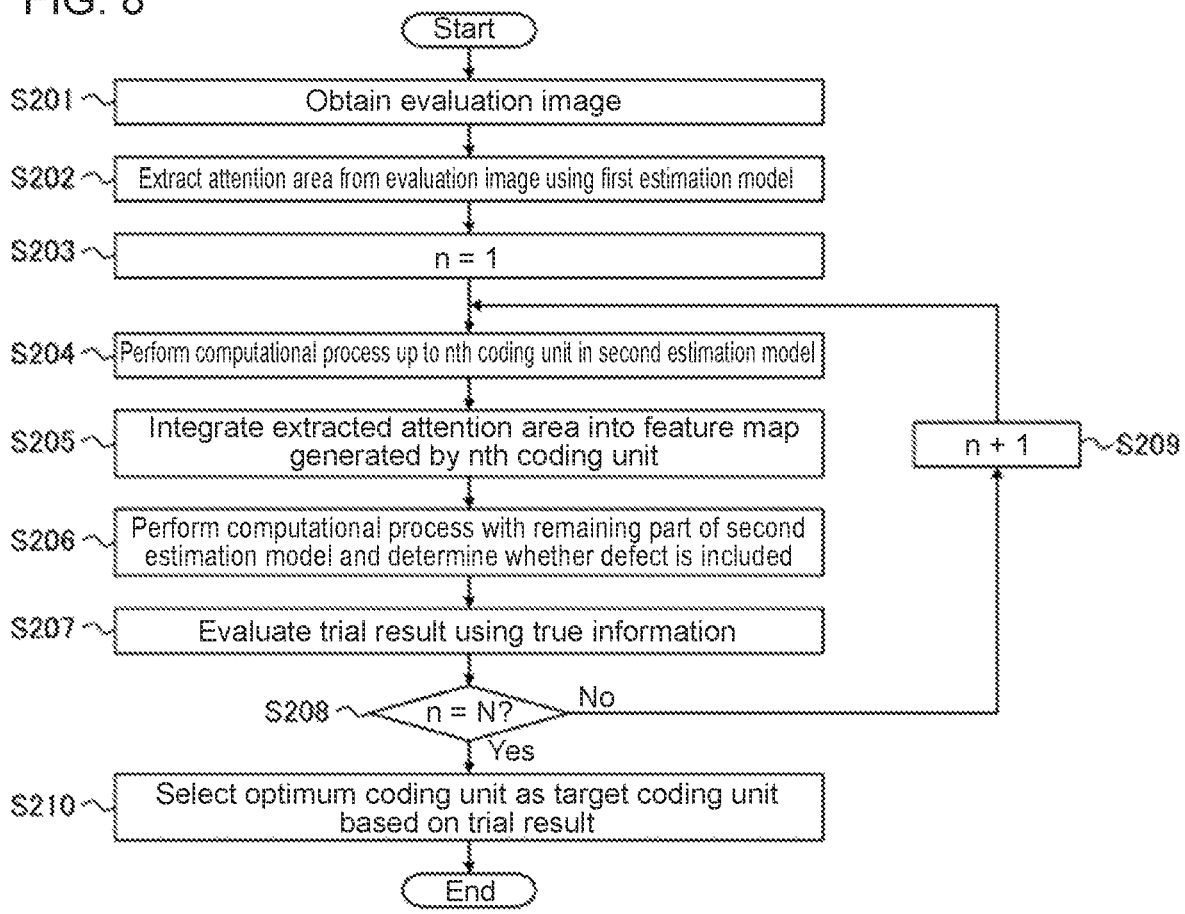
FIG. 8 is a flowchart illustrating an example procedure for selecting a target coding unit performed by an inspection apparatus according to one or more embodiments.

FIG. 8 is a flowchart of an example procedure for selecting a target coding unit performed by the inspection apparatus 2 according to the present embodiment. The controller 21 operates as the selector 216 and performs the processing in steps S201 to S210 described below. The procedure for selecting a target coding unit described below is a mere example, and each of its steps may be modified in any possible manner. In the procedure for selecting a target coding unit described below, steps may be eliminated, substituted, or added as appropriate in each embodiment.

Step S201

In step S201, the controller 21 obtains an evaluation image 228 of a product for evaluation having a predetermined defect. In the present embodiment, the controller 21 obtains a data set 227 for evaluation, which includes a pair of the evaluation image 228 and true information 229. The evaluation image 228 may be generated, in the same manner as the acceptable-product images 31, the training images 37, and other images, with a camera imaging a product for evaluation having a predetermined defect. In some embodiments, the evaluation image 228 may be generated by any image processing. The true information 229 is structured as appropriate to indicate the image range of the predetermined defect. For example, the true information 229 may be structured similarly to the true images 38. The number of evaluation data sets 227 to be obtained may be determined as appropriate. After obtaining the evaluation data set 227, the controller 21 advances the processing to subsequent step S202.

Step S202

In step S202, the controller 21 extracts an attention area from the obtained evaluation image 228 using the first estimation model 5. In the present embodiment, the controller 21 refers to the first training-result data 121 and defines the trained first estimation model 5. Subsequently, the controller 21 inputs the evaluation image 228 into the input layer 511 of the encoder 51 in the first estimation model 5 and performs a forward propagation computation with the encoder 51 and the decoder 53. After the computational process, the controller 21 obtains the decoded image generated based on the evaluation image 228 from the output layer 533 of the decoder 53.

The controller 21 calculates the difference area between the generated decoded image and the evaluation image 228. The controller 21 may obtain the calculated unprocessed difference area as an extracted image (extracted attention area). With an expansion parameter being preset, the controller 21 may obtain the extracted image by expanding the calculated difference area in accordance with the preset value of the expansion parameter. Expanding the difference area may include, for example, blurring (specifically, smoothing with a filter) and dilation. In one example, the expansion parameter may indicate a filter such as a Gaussian filter. In this case, the controller 21 may obtain the extracted image by smoothing the difference area with the filter indicated by the value of the expansion parameter. After extracting the attention area from the evaluation image 228, the controller 21 advances the processing to subsequent step S203.

Steps S203 to S209

In step S203, the controller 21 sets a variable n to 1. The variable n is used to indicate a coding unit 62 tentatively selected as a target coding unit.

In step S204, the controller 21 refers to the second training-result data 125 and defines the trained second estimation model 6. The second estimation model 6 may be defined before the processing in step S203. The controller 21 inputs the evaluation image 228 into the input layer of the encoder 61 in the second estimation model 6 and performs a forward propagation computation up to the n-th coding unit 62. The controller 21 thus obtains a feature map 63 from the n-th coding unit 62.

In step S205, the controller 21 integrates the extracted image obtained in the processing in step S202 into the feature map 63 generated by the n-th coding unit 62. The attention area extracted by the first estimation model 5 may be integrated with any method that allows the extracted attention area to be reflected on the likelihood determination about a defect performed by the second estimation model 6. The integration method may be determined as appropriate in each embodiment. With one simple integration method, the controller 21 may resize the extracted image appropriately for the size of the target feature map 63 by which the extracted image is integrated and multiply the resized extracted image by the target feature map 63. The controller 21 can integrate the extracted attention area into the target feature map 63 through these series of processing steps. With this integration method, the controller 21 inputs the above integration result into the next layer.

In step S206, the controller 21 performs a forward propagation computation with the remaining part of the second estimation model 6 (specifically, the components after the n-th coding unit 62). The controller 21 thus obtains, through the computation, the determination image for the evaluation image 228 from the output layer of the decoder 65 as a computation result from the second estimation model 6. The controller 21 determines whether the product for evaluation has a defect based on the determination image (computation result from the second estimation model 6). Through the processing from steps S204 to S206, the controller 21 can obtain the result of the trial determination as to whether the product for evaluation in the evaluation image 228 has a defect with the n-th coding unit being tentatively selected as the target coding unit.

In step S207, the controller 21 evaluates, using the true information 229, the trial result obtained through processing up to step S206. The controller 21 provides higher evaluation to the coding unit 62 tentatively selected as the target coding unit in the trial when the determination accuracy (specifically, detection accuracy of defects) is higher. Any evaluation method or scale that allows evaluation in this manner may be used. In one example, the controller 21 may score the degree of overlap between a true range and a detected range as an evaluation value. The true range is an image range of a predetermined defect indicated by the true information 229. The detected range is an image range determined to include a defect (or determined to have a high likelihood of including a defect) based on the determination image.

In step S208, the controller 21 determines a branch destination of the processing based on the value of the variable n. For the variable n being a value other than N (2 or greater), the controller 21 advances the processing to step S209. N is the number of coding units 62 included in the encoder 61. In step S209, the controller 21 increments the value of the variable n by 1. The controller 21 then performs the processing from step S204 again based on the new variable n. For the variable n being N, the controller 21 advances the processing to step S210.

In the present embodiment, the controller 21 iterates the processing from steps S204 to S206 while changing the value of variable n through the above loop processing. This series of processing steps allows the controller 21 to iterate the computational process with the second estimation model 6 using the attention area extracted from the evaluation image 228 while changing the coding unit 62 tentatively selected as the target coding unit. The iterative processing allows the controller 21 to perform, for each coding unit 62, a trial determination (defect detection) as to whether the evaluation product in the evaluation image 228 has a defect with the coding unit 62 being tentatively selected as the target coding unit.

The above trial method is an example. The trial defect detection for the evaluation product may be performed with any other method changeable as appropriate in each embodiment. In the above example, one of the coding units 62 is tentatively selected as the target coding unit in each trial. However, any number of coding units 62 may be tentatively selected as the target coding units in each trial, and two or more coding units 62 may be tentatively selected as target coding units.
Step S210

In step S210, the controller 21 selects the optimum coding unit 62 as the target coding unit based on the trial result. In the present embodiment, the controller 21 selects the coding unit 62 with the highest evaluation obtained in step S207 (specifically, the coding unit 62 that yields the most accurate determination trial result) as the target coding unit. After selecting the target coding unit, the controller 21 ends the processing for selecting the target coding unit in the present operation example. The processing can automatically optimize the accuracy of visual inspection with the two estimation models (5 and 6).

(2) Visual Inspection

Figure 9:
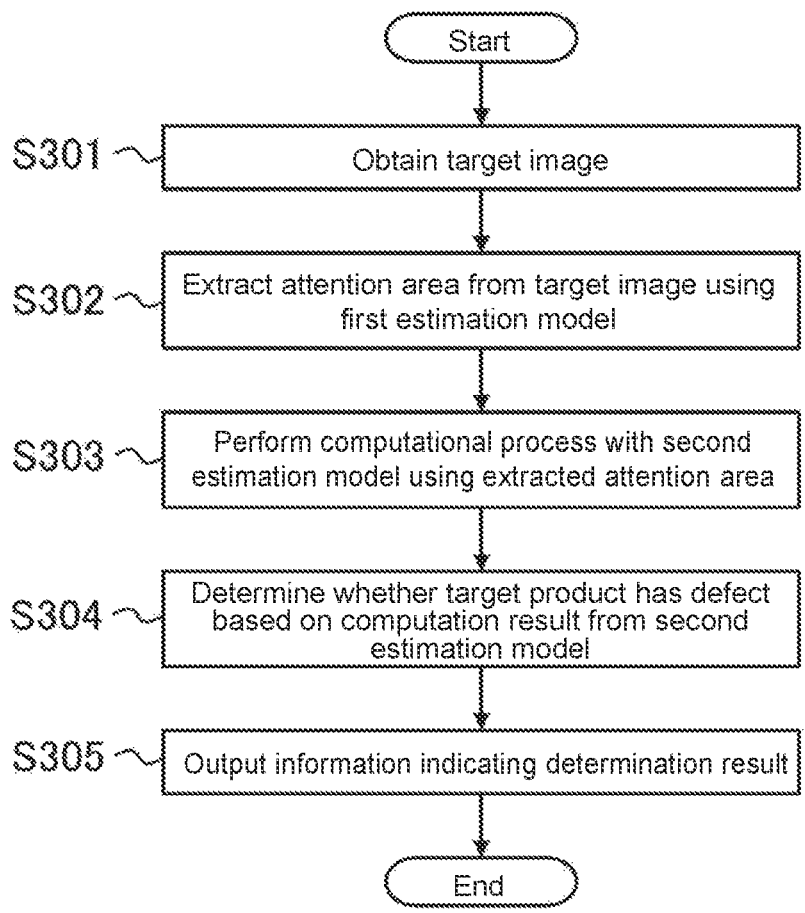
FIG. 9 is a flowchart illustrating an example procedure for visual inspection performed by an inspection apparatus according to one or more embodiments.

FIG. 9 is a flowchart of an example procedure for visual inspection performed by the inspection apparatus 2 according to the present embodiment. The procedure for visual inspection described below is a mere example of an inspection method, and each of its steps may be modified in any possible manner. In the procedure for visual inspection described below, steps may be eliminated, substituted, or added as appropriate in each embodiment.
Step S301

In step S301, the controller 21 operates as the data obtainer 211 and obtains the target image 221 of the target product R to be inspected. In the present embodiment, the controller 21 directly obtains the target image 221 from the camera S through the external interface 24. The target image 221 may be a moving image or a still image. The target image 221 may be obtained through any other path. For example, the camera S may be connected to another computer. In this case, the controller 21 may indirectly obtain the target image 221 from the camera S through another computer. After obtaining the target image 221, the controller 21 advances the processing to subsequent step S302.
Step S302

In step S302, the controller 21 operates as the area extractor 212 and extracts an attention area from the target image 221 using the first estimation model 5.

In the present embodiment, the controller 21 defines the trained first estimation model 5 by referring to the first training-result data 121 in the same manner as in step S202. The controller 21 then inputs the target image 221 into the input layer 511 of the encoder 51 included in the first estimation model 5 and performs a forward propagation computation with the encoder 51 and the decoder 53. The computational process allows the controller 21 to obtain the target decoded image 223 generated based on the target image 221 from the output layer 533 of the decoder 53. The controller 21 calculates the difference area between the generated target decoded image 223 and the target image 221 and generates the extracted image 225 based on the calculated difference area. The extracted image 225 may be generated as an attention map indicating, for each pixel, a probability of a defect being included.

In the same manner as in step S202, the controller 21 may obtain the calculated unprocessed difference area as the extracted image 225. In some embodiments in which an expansion parameter is preset, the controller 21 may obtain the extracted image 225 by expanding the calculated difference area in accordance with the set value of the expansion parameter. The structure using the expansion parameter as in this embodiment allows easy adjustment of the degree by which the estimation result from the first estimation model 5 is reflected on the visual inspection. The expansion parameter is an example of a parameter that defines the degree by which an image area including a defect is extracted as an extraction area (hereafter also referred to as an extraction parameter). The value of the parameter may be set at any selected time. For example, before or during the processing for the visual inspection in the present operation example, the controller 21 may receive indication of a value of the parameter through the input device 25. After obtaining the extracted image 225 (extracted attention area), the controller 21 advances the processing to subsequent step S303.

Step S303

In step S303, the controller 21 operates as the model computation unit 213 and performs the computational process with the second estimation model 6 using the attention area (extracted image 225) extracted from the target image 221 by the first estimation model 5.

In the present embodiment, the controller 21 refers to the second training-result data 125 to define the trained second estimation model 6. The controller 21 inputs the target image 221 into the input layer of the encoder 61 included in the second estimation model 6 and performs a forward propagation computation up to a coding unit 62 selected as the target coding unit. The computational process allows the controller 21 to obtain a feature map 63 from the selected coding unit 62. Subsequently, the controller 21 integrates the extracted image 225 into the feature map 63 generated by the selected coding unit 62. The same integration method as in step S205 may be used. When multiple coding units 62 are selected as target coding units, the controller 21 performs the forward propagation computation and the integration process up to each selected coding unit 62 sequentially from the input end. The controller 21 then performs a forward propagation computation with the remaining portion of the second estimation model 6. This allows the controller 21 to obtain the determination image for the target image 221 from the output layer of the decoder 65 as a computation result from the second estimation model 6.

In the present embodiment, the controller 21 performs the computational process with the coding units 62 in the encoder 61 sequentially from the input end in the computational process with the second estimation model 6. The computational process with each coding unit 62 causes multiple projection processes to be performed on the target image 221, thus generating multiple feature maps 63 with different dimensions. The extracted image 225 is integrated into the feature map 63 generated by at least one target coding unit selected in the computational process with the second estimation model 6. After the computational process with the second estimation model 6, the controller 21 advances the processing to subsequent step S304.

Step S304

In step S304, the controller 21 operates as the determiner 214 and determines whether the target product R has a defect based on the computation result from the second estimation model 6.

Determining whether a defect is included is determining whether a defect has been detected with reference to the output (computation result) from the second estimation model 6. The form of the determination may be determined as appropriate in accordance with, for example, the output form of the second estimation model 6. In one example, determining whether a defect is included may include determining whether a defect is included, identifying the type of defect, extracting the area in which the defect is included (or the area with a probability of including the defect), estimating the likelihood of a defect being included, or a combination of these. The controller 21 may obtain the unprocessed determination image as a determination result or obtain the determination image that has undergone information processing (e.g., threshold determination) as a determination result. After determining whether the target product R has a defect, the controller 21 advances the processing to subsequent step S305.

Step S305

In step S305, the controller 21 outputs information indicating the result of determining whether the target product R has a defect.

The destination and the details of the output information may be determined as appropriate in each embodiment.

The information may be output to, for example, the RAM in the controller 21, the output device 26, or another computer. Information indicating the determination result may include information obtained through information processing performed based on the determination result (e.g., a specific message, or a control command for a control target device). In one example, the controller 21 may output the result of determining whether the target product R has a defect directly to the output device 26 or another computer. In another example, the controller 21 may output, in response to determining that the target product R has a defect, a warning indicating the defect to the output device 26 or another computer. In still another example, the inspection apparatus 2 may be connected to a conveyor that transports the target product R. In this case, the controller 21 may control the conveyor to separately transport defective target products R and defect-free target products R on different lines based on the determination results.

After outputting the information indicating the determination result, the controller 21 ends the procedure for the visual inspection in the present operation example. The controller 21 may continuously iterate the series of information processing in steps S301 to S305. The processing may be repeated in any selected time. During iteration of the processing, the target product R may be switched sequentially between, for example, conveyors. This allows the inspection apparatus 2 to continuously perform the visual inspection of the target product R.

Features

In the present embodiment described above, the visual inspection of the target product R performed in steps S301 to S305 uses the first estimation model 5 designed specifically for the target environment, in addition to the second estimation model 6 trained to determine the likelihood of a defect being included. The use of the first estimation model 5 is expected to improve the accuracy of visual inspection of the target product R. In step S303 of the present embodiment, the attention area (extracted image 225) extracted by the first estimation model 5 is integrated into at least one of the feature maps 63 with different dimensions in the computational process with the second estimation model 6. In other words, the computational process with the second estimation model 6 can change the dimension into which the attention area extracted by the first estimation model 5 is integrated. This allows adjusting the range for determining the likelihood of a defect being included at the dimensional level, thus allowing the integration process to be performed appropriately for the appearance of the target product R. For example, a product with a patterned appearance may be inspected by referring to a relatively broad range. A product with a simple appearance may be inspected by referring to a relatively narrow range. Thus, the structure in the present embodiment is expected to improve the accuracy of visual inspection of target products R in various appearances using the two estimation models (5 and 6).

4. Modifications

The embodiment of the present invention described in detail above is a mere example of the present invention in all respects. The embodiment may be variously modified or altered without departing from the scope of the present invention. For example, the embodiment may be modified in the forms described below. In the modifications described below, the same reference numerals denote the same components in the above embodiment. Such components will not be described. The modifications described below may be combined as appropriate.

4.1

In the above embodiment, each of the encoder 51 and the decoder 53 included in the first estimation model 5 includes a fully connected neural network. The encoder 61 included in the second estimation model 6 includes a convolutional neural network. However, each estimation model (5 or 6) may be of any other type of neural network selected as appropriate in each embodiment. For example, the encoder 51 in the first estimation model 5 may be a convolutional neural network.

In the above embodiment, each estimation model (5 or 6) includes a neural network as a machine learning model. The machine learning model used as each estimation model (5 or 6) may be other than a neural network and selected as appropriate in each embodiment. The machine learning method may be selected as appropriate for the type of machine learning model. For example, the encoder 51 and the decoder 53 in the first estimation model 5 may each include an orthogonal projection matrix with eigenvectors derived from principal component analysis. In this case, machine learning with the first estimation model 5 may include principal component analysis.

In the above embodiment, each estimation model (5 or 6) is generated through machine learning. However, each estimation model (5 or 6) may be generated with any other method determined as appropriate in each embodiment. In one example, each estimation model (5 or 6) may be manually generated with a rule-based system. In this case, each estimation model (5 or 6) may be generated through known image processing such as feature extraction. Each coding unit 62 may be structured as appropriate to perform a projection process for reducing dimensions, such as pooling and reduction. The first estimation model 5 may extract an attention area having a high probability of a defect being included with a known method such as a method described in Japanese Unexamined Patent Application Publication No. 2010-203845, other than the method based on reconstruction errors. In the above embodiment, the coding units 62 are connected in series in the encoder 61 included in the second estimation model 6. However, the coding units 62 may be arranged in any other manner. At least two of the coding units 62 may be arranged in parallel to generate multiple feature maps 63 with different dimensions. In some embodiments, all the coding units 62 may be arranged in parallel.

Figure 10:
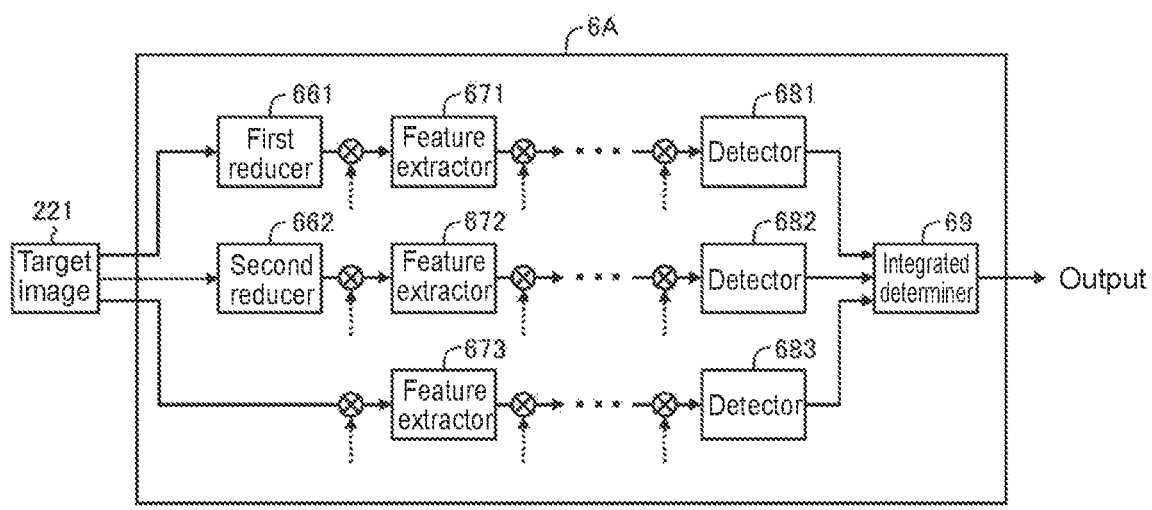
FIG. 10 is a schematic diagram illustrating an example of a second estimation model in another embodiment or embodiments.

FIG. 10 is a schematic diagram of an example of a second estimation model 6A in a modification. The second estimation model 6A in the present modification includes three detection units arranged in parallel to perform at least two multiple projection processes in parallel. More specifically, a first detection unit includes, sequentially from the input end, a first reducer 661, one or more feature extractors 671, and a detector 681. A second detection unit includes, sequentially from the input end, a second reducer 662, one or more feature extractors 672, and a detector 682. A third detection unit includes, sequentially from the input end, one or more feature extractors 673 and a detector 683.

The first reducer 661 and the second reducer 662 reduce the size of an input image (specifically, reduce the dimensionality of the input image). The size of an input image may be reduced by, for example, thinning out pixels in the image (e.g., pooling) or using an area-average method. The computational process performed with each reducer (661 or 662) is an example of the projection process including projection into a low-dimensional space. The first reducer 661 and the second reducer 662 generate images of different sizes. In one example, the first reducer 661 may resize the input image by half, and the second reducer 662 may resize the input image by a quarter.

Each of the feature extractors 671 to 673 extracts features of an image. The process of extracting image features may include known filtering using, for example, a Sobel filter or a Laplacian filter. The number of feature extractors 671, 672, or 673 may be determined as appropriate in each embodiment. In one example, one or more feature extractors 671, one or more feature extractors 672, and one or more feature extractors 673 may extract features of a defect and exclude other features (specifically, extract candidate areas of a defect).

Each of the detectors 681 to 683 detects a defect area based on the image features obtained with the corresponding feature extractor 671, 672, or 673. In one example, each of the feature extractors 671 to 673 extracts candidate areas of a defect. In this case, each of the detectors 681 to 683 may detect, from the extracted candidate areas, a candidate area with its size exceeding a threshold as a defect area.

The detection units can obtain defect detection results from multiple images with different dimensions. In the present modification, the reduced images generated by the reducers (661 and 662) and the images output from the feature extractors 671 to 673 are examples of feature maps. As indicated by the dotted arrows in FIG. 10, the extracted image 225 obtained by the first estimation model 5 may be integrated into at least one of the images (feature maps). The third detection unit, which does not include a reducer, may perform the computational process with the feature extractor 673 after the extracted image 225 is integrated into the target image 221. As shown in FIG. 10, the integration process may include integration of images. The selector 216 in the inspection apparatus 2 may enable or disable the integration process for each candidate image.

The second estimation model 6A in the present modification further includes an integrated determiner 69 that integrates the results of defect detection from the three detection units and determines the presence of a defect based on the integrated result. In one example, the integrated determiner 69 may first adjust the image sizes of the defect areas detected by the detectors 681 to 683 to match and then superpose the defect areas to finally determine the presence and the position of any defect based on the superposed images. Superposing the defect areas may include, for example, AND operations (extracting overlapping areas alone) and OR operations (adding up the areas).

The second estimation model 6A in the present modification outputs the final result of the defect determination. In one example, the second estimation model 6A may output the unprocessed result of the determination performed by the integrated determiner 69. In another example, the second estimation model 6A may further include a defect highlighter (not shown) that processes, in response to the integrated determiner 69 determining that a defect is included, the target image 221 to highlight the portion of the defect. The highlighter may emphasize the defect portion in any manner determined as appropriate. In one example, the defect highlighter may adjust the luminance value of each pixel in the target image 221 to increase the contrast around the detected defect and decrease the contrast in areas other than the surroundings of the defect. In this case, the second estimation model 6A may output the defect-highlighted image obtained by the defect highlighter.

The second estimation model 6A in the present modification may include two or four or more detection units arranged in parallel, rather than three. Each detection unit may perform the process of reducing the size of the image multiple times. In other words, the detection unit may include multiple reducers.

In the above embodiment, for example, some of the feature maps 63 generated with the second estimation model 6 may have the same dimensionality when a process performed does not involve dimension reduction (e.g., simple filtering) or the feature maps generated in parallel may have the same number of dimensions reduced. In this case, the feature map 63 to be integrated with the attention area extracted by the first estimation model 5 may be changed to another feature map 63 with the same dimension. This allows changing the features to be integrated with the attention area extracted by the first estimation model 5.

In the above embodiment, each estimation model (5 or 6) may be output in a form determined as appropriate in each embodiment. For example, the second estimation model 6 may include a determiner instead of the decoder 65. The determiner may determine whether a defect is included based on the features obtained by the encoder 61. In this case, each training data set 36 included in the second training data 35 for machine learning may include true information indicating whether a defect is included, instead of the true image 38. The model generation apparatus 1 can appropriately train the second estimation model 6 by using such second training data 35 in step S152. In the above embodiment, each estimation model (5 or 6) may be generated with a separate computer. The first estimation model 5 may be generated based on the first training data 30 obtained at one site. The second estimation model 6 may be generated based on the second training data 35 collected at multiple sites.

4.2

In the above embodiment, the extraction parameter may be other than the expansion parameter. In one example, the inspection apparatus 2 may generate a difference image by calculating the difference between the target decoded image 223 and the target image 221. The inspection apparatus 2 may then binarize each pixel in the difference image based on a threshold (binarization threshold). The inspection apparatus 2 may then delete, of the clusters of binarized pixels that indicate the presence of a defect, the cluster with its area being less than a threshold (area threshold). Through the series of processes, the inspection apparatus 2 may calculate the difference area between the target decoded image 223 and the target image 221. In this case, the extraction parameter may include at least one of the binarization threshold or the area threshold. The process of setting the values of such parameters may be eliminated in the above embodiment. In this case, the setting unit 217 may be eliminated from the software configuration of the inspection apparatus 2.

4.3

In the above embodiment, the processing in steps S201 to S210 allows automatic selection of the optimum target coding unit for the target environment. However, the target coding unit may be selected with any other method. The controller 21 may select at least one target coding unit from the coding units 62 with any method. With one example method, the controller 21 may skip the processing in step S207 of the processing in steps S201 to S210. The controller 21 may further output the result of the trial performed in step S206 to the operator, instead of performing the processing in step S210. The output destination may be selected as appropriate. The controller 21 may then receive selection of at least one target coding unit from the coding units 62 indicated by the operator. For example, the controller 21 may output a list of determination images obtained in the trials to the output device 26. The controller 21 may receive the selection of at least one target coding unit from the coding units 62 with the indication of an appropriate determination image by the operator through the input device 25. The processing in steps S201 to S206, S208, and S209 may be performed in the same manner as in the above embodiment. The processing can optimize the accuracy of visual inspection performed with the two estimation models (5 and 6) through an operation. With another example method, the controller 21 may skip the processing in steps S201 to S210 and simply receive the selection of the target coding unit indicated by the operator. In the above embodiment, the series of processing steps for selecting the target coding unit may be eliminated. In this case, the selector 216 may be eliminated from the software configuration of the inspection apparatus 2.

4.4

In the above embodiment, the extracted attention area can be integrated into a target feature map 63 by multiplying the target feature map 63 by the extracted image. However, the attention area may be integrated with any other method. With one example method, the target feature map 63 and the extracted image may each be input into a different node of a layer subsequent to the layer from which the target feature map 63 is obtained. In this case, the extracted attention area can be integrated into the target feature map 63 through the computational process performed with the subsequent layer. In this case, the controller 11 may input the extracted image obtained for the training image 37 by the trained first estimation model 5 into the target layer in the machine learning process in step S152.

4.5

In the above embodiment or modifications, the target coding unit may be selected by a computer other than the inspection apparatus 2.

Figure 11:
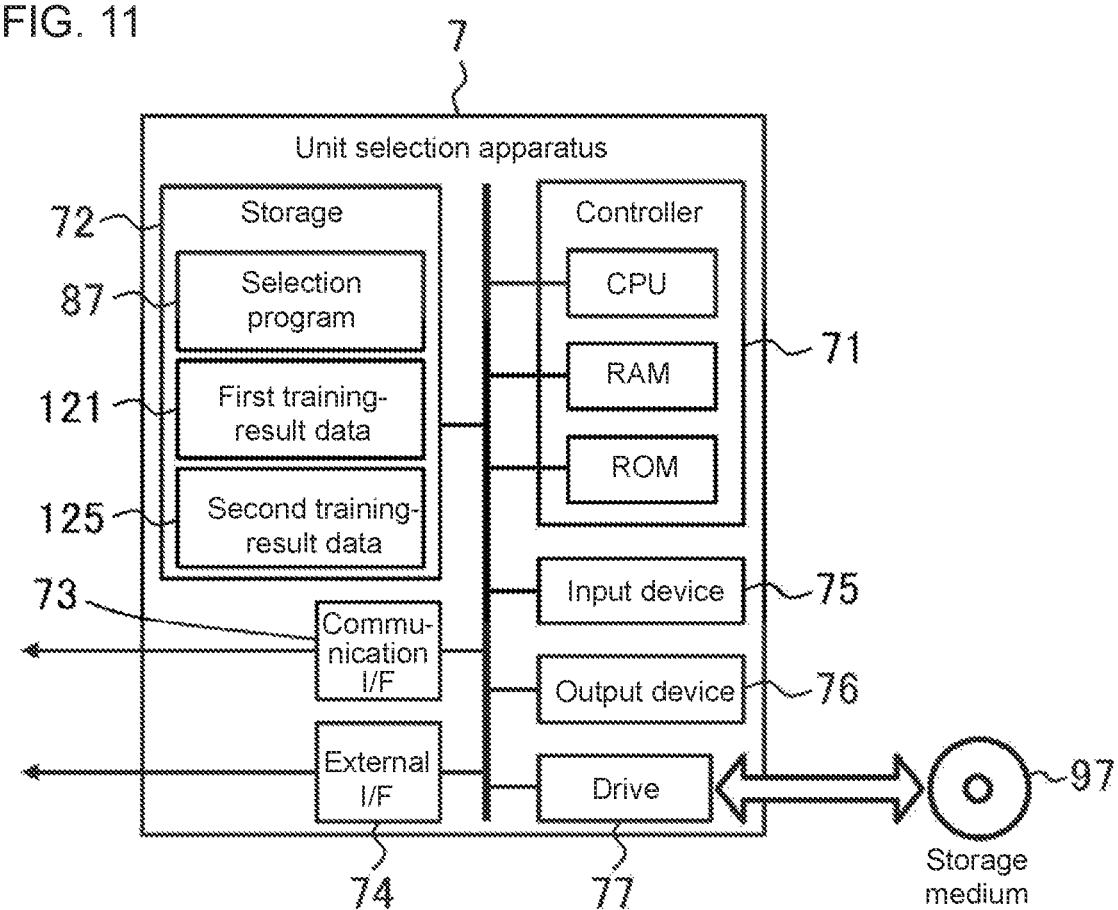
FIG. 11 is a schematic diagram illustrating a unit selection apparatus in another embodiment or embodiments that includes an example hardware configuration.

FIG. 11 is a schematic diagram of a unit selection apparatus 7 in the present modification showing its example hardware configuration. As shown in FIG. 11, the unit selection apparatus 7 in the present modification is a computer including a controller 71, a storage 72, a communication interface 73, an external interface 74, an input device 75, an output device 76, and a drive 77 that are electrically connected to one another. The components from the controller 71 to the drive 77 may have the same structure as the components from the controller 21 to the drive 27 in the inspection apparatus 2, and the storage medium 97 may have the structure as the storage medium 92.

In the present modification, the storage 72 stores various items of information such as a selection program 87, first training-result data 121, and second training-result data 125. The selection program 87 causes the unit selection apparatus 7 to perform information processing for selection of a target coding unit. The selection program 87 includes a series of commands for the information processing. At least one of the selection program 87, the first training-result data 121, or the second training-result data 125 may be stored in the storage medium 97. The unit selection apparatus 7 may obtain at least one of the selection program 87, the first training-result data 121, or the second training-result data 125 from the storage medium 92.

For the specific hardware configuration of the unit selection apparatus 7, components may be eliminated, substituted, or added as appropriate depending on each embodiment as with, for example, the inspection apparatus 2. The unit selection apparatus 7 may include multiple computers. In this case, each computer may have the same or a different hardware configuration. The unit selection apparatus 7 may be an information processing apparatus dedicated to a service to be provided, or may be a general-purpose server, a general-purpose PC, or a PLC.

Figure 12:
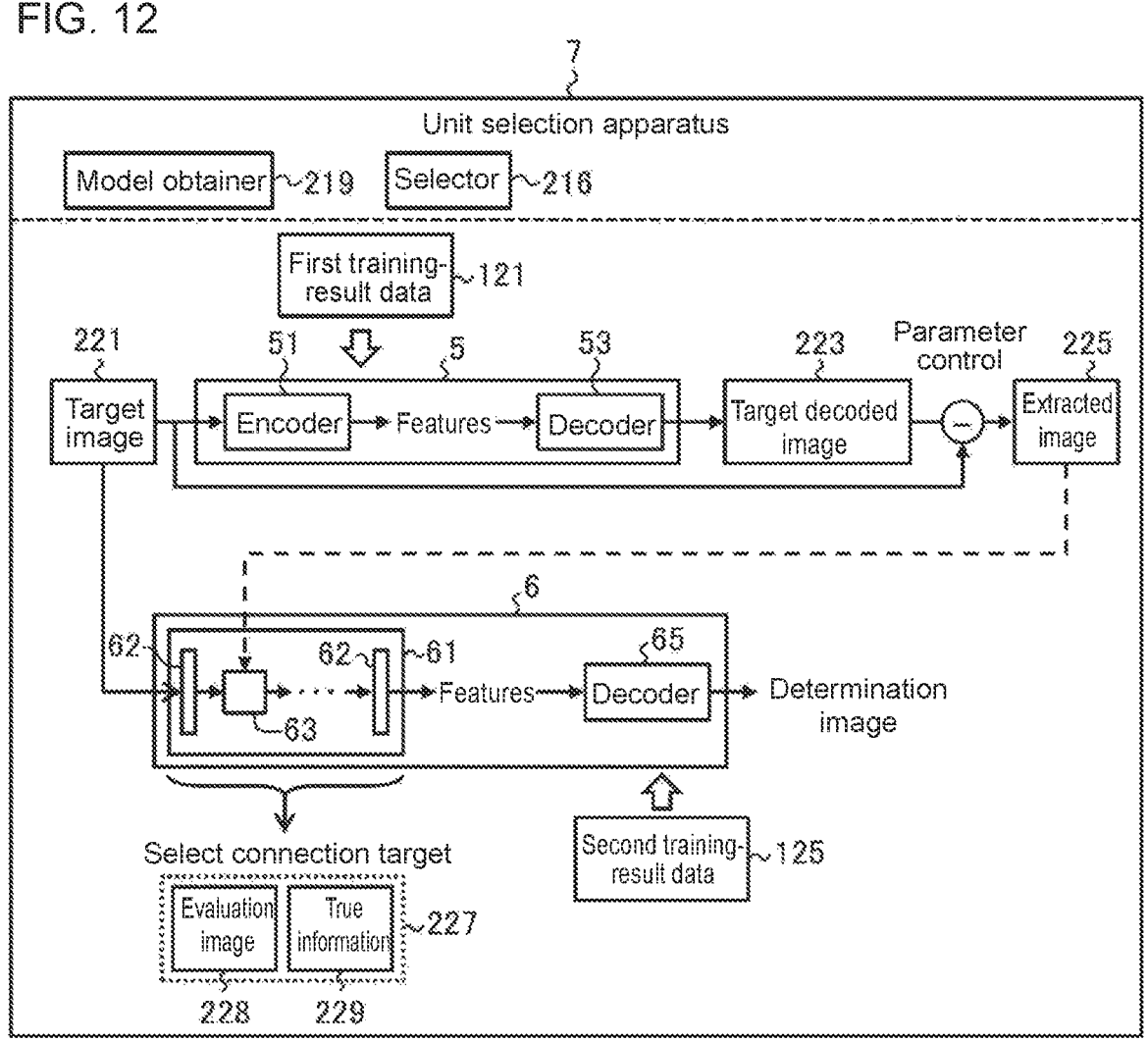
FIG. 12 is a schematic diagram illustrating a unit selection apparatus in another embodiment or embodiments that includes an example software configuration.

FIG. 12 is a schematic diagram of the unit selection apparatus 7 in the present modification showing its example software configuration. In the same manner as with, for example, the inspection apparatus 2, the software configuration of the unit selection apparatus 7 is implemented by the controller 71 executing the selection program 87. Executing the selection program 87 causes the unit selection apparatus 7 in the present modification to operate as a computer including a model obtainer 219 and a selector 216 as software modules. Some or all of the software modules may be implemented by one or more dedicated processors. In other words, each of the modules may be implemented as a hardware module. For the software configuration of the unit selection apparatus 7, software modules may be eliminated, substituted, or added as appropriate in each embodiment.

The controller 71 operates as the model obtainer 219 and obtains the training-result data (121 and 125) with any method. The controller 71 thus obtains the estimation models (5 and 6) to be the target of the process of selecting a target coding unit. Subsequently, the controller 71 operates as the selector 216 to select at least one target coding unit from multiple coding units 62. The target coding unit may be selected with any of the methods described above.

The result of selecting the target coding unit may be reflected in any manner to the inspection apparatus that performs the visual inspection of the target product R in the target environment. In one example, the controller 71 may operate as an output unit and notify the inspection apparatus of the result of selecting the target coding unit through, for example, a network. In response the notification, the inspection apparatus may reflect the result of selecting the target coding unit. In another example, the controller 71 may output the result of selecting the target coding unit to the output device 76 or output devices in other computers. The operator may refer to the output and operate the inspection apparatus to reflect the result of selecting the target coding unit to the inspection apparatus. The structure in this modification can reduce the load on the inspection apparatus.

The invention claimed is:

1. An inspection apparatus, comprising a processor configured with a program to perform operations comprising:
    operation as a data obtainer configured to obtain a target image of a target product to be inspected;
    operation as an area extractor configured to extract an attention area from the obtained target image using a first estimation model, the first estimation model being generated by training to extract, as the attention area, an image area having a probability of a defect being comprised therein, based on first training data, the first training data comprising a plurality of first training images of defect-free products obtained in a target inspection environment;
    operation as a model computation unit configured to perform a computational process with a second estimation model using the attention area extracted from the target image by the first estimation model,
        the second estimation model being generated by training to determine a likelihood of the defect being comprised therein, based on second training data comprising a plurality of second training images of defects,
        the computational process with the second estimation model comprising a plurality of projection processes performed on the target image, the plurality of projection processes comprising projecting the target image into different spaces with lower dimensions to generate a plurality of feature maps with different dimensions,
        the extracted attention area being integrated into at least one of the plurality of feature maps in the computational process with the second estimation model;
    operation as a determiner configured to determine whether the target product has a defect based on a computation result from the second estimation model; and
    operation as an output unit configured to output information indicating a result of determining whether the target product has a defect.

2. The inspection apparatus according to claim 1, wherein
    the second estimation model comprises an encoder configured to convert an image into a feature and a decoder configured to decode the image from the feature, and the decoded image indicates, for each pixel, a likelihood of the defect being comprised therein,
    the encoder comprises a plurality of coding units connected in series sequentially from an input end of the encoder,
    each of the plurality of coding units converts input data into a feature map with a lower dimension than the input data,
    the plurality of projection processes performed on the target image include comprises computational processes performed with the plurality of coding units sequentially from the input end, and
    the extracted attention area is integrated into a feature map generated by at least one of the plurality of coding units in the computational process with the second estimation model.

3. The inspection apparatus according to claim 2, wherein
    the processor is configured with the program to perform operations further comprising operation as a selector configured to select at least one target coding unit from the plurality of coding units, and
    the extracted attention area is integrated into a feature map generated by the selected at least one target coding unit in the computational process with the second estimation model.

4. The inspection apparatus according to claim 3, wherein the processor is configured with the program to perform operations such that operation as the selector comprises
    obtaining an evaluation image of a product for evaluation having a predetermined defect,
    extracting an attention area from the obtained evaluation image using the first estimation model,
    iterating the computational process with the second estimation model using the attention area extracted from the evaluation image while changing a coding unit tentatively selected as the at least one target coding unit to perform, for each of the plurality of coding units, a trial determination as to whether the product for evaluation in the evaluation image has a defect with the coding unit being tentatively selected as the at least one target coding unit, and selecting an optimum coding unit as the at least one target coding unit based on a result of the trial determination.

5. The inspection apparatus according to claim 3, wherein the processor is configured with the program to perform operations such that operation as the selector comprises obtaining an evaluation image of a product for evaluation having a predetermined defect, extracting an attention area from the obtained evaluation image using the first estimation model, iterating the computational process with the second estimation model using the attention area extracted from the evaluation image while changing a coding unit tentatively selected as the at least one target coding unit to perform, for each of the plurality of coding units, a trial determination as to whether the product for evaluation in the evaluation image has a defect with the coding unit being tentatively selected as the at least one target coding unit, outputting a result of the trial determination, and receiving selection of the at least one target coding unit from the plurality of coding units.

6. The inspection apparatus according to claim 2, wherein the encoder comprises a convolutional neural network, and each of the plurality of coding units comprises one or more convolutional layers and one or more pooling layers.

7. The inspection apparatus according to claim 1, wherein the processor is configured with the program to perform operations further comprising operation as a setting unit configured to set a value of a parameter defining a degree of occurrence of the image area comprising the defect being extracted as the attention area, and such that operation as the area extractor comprises extracting the attention area in accordance with the set value of the parameter.

8. The inspection apparatus according to claim 7, wherein the first estimation model comprises an encoder configured to convert an image into a feature and a decoder configured to decode the image from the feature, the processor is configured with the program to perform operations such that operation as the area extractor comprises generating a target decoded image for the target image using the encoder and the decoder in the first estimation model, and calculating a difference area between the generated target decoded image and the target image, the parameter comprises an expansion parameter defining a degree by which the difference area is to be expanded, and the processor is configured with the program to perform operations such that operation as the area extractor comprises obtaining the extracted attention area by expanding the calculated difference area in accordance with a set value of the expansion parameter.

9. The inspection apparatus according to claim 1, wherein the extracted attention area comprises an attention map.

10. The inspection apparatus according to claim 1, wherein the first estimation model is generated, by training through machine learning using the first training data, to extract, as the attention area, the image area having the probability of the defect being comprised therein.

11. The inspection apparatus according to claim 1, wherein the second estimation model is generated, by training through machine learning using the second training data, to determine the likelihood of the defect being comprised therein.

12. An inspection method implementable with a computer, the method comprising:

obtaining a target image of a target product to be inspected;

extracting an attention area from the obtained target image using a first estimation model, the first estimation model being generated by training to extract, as the attention area, an image area having a probability of a defect being comprised therein, based on first training data, the first training data comprising a plurality of first training images of defect-free products obtained in a target inspection environment;

performing a computational process with a second estimation model using the attention area extracted from the target image by the first estimation model, the second estimation model being generated by training to determine a likelihood of the defect being comprised therein based on second training data comprising a plurality of second training images of defects, the computational process with the second estimation model comprising a plurality of projection processes performed on the target image, the plurality of projection processes including comprising projecting the target image into different spaces with lower dimensions to generate a plurality of feature maps with different dimensions, the extracted attention area being integrated into at least one of the plurality of feature maps in the computational process with the second estimation model;

determining whether the target product has a defect based on a computation result from the second estimation model; and outputting information indicating a result of determining whether the target product has a defect.

13. A non-transitory computer-readable storage medium storing an inspection program, which when read and executed, causes a computer to perform comprising:

obtaining a target image of a target product to be inspected;

extracting an attention area from the obtained target image using a first estimation model, the first estimation model being generated by training to extract, as the attention area, an image area having a probability of a defect being comprised therein, based on first training data, the first training data comprising a plurality of first training images of defect-free products obtained in a target inspection environment;

performing a computational process with a second estimation model using the attention area extracted from the target image by the first estimation model, the second estimation model being generated by training to determine a likelihood of the defect being comprised therein, based on second training data comprising a plurality of second training images of defects, the computational process with the second estimation model comprising a plurality of projection processes performed on the target image, the plurality of projection processes comprising projecting the target image into different spaces with lower dimensions to generate a plurality of feature maps with different dimensions, the extracted attention area being integrated into at least one of the plurality of feature maps in the computational process with the second estimation model;

determining whether the target product has a defect based on a computation result from the second estimation model; and outputting information indicating a result of determining whether the target product has a defect.

14. The inspection apparatus according to claim 3, wherein
the encoder comprises a convolutional neural network, and
each of the plurality of coding units comprises one or more convolutional layers and one or more pooling layers.

15. The inspection apparatus according to claim 4, wherein
the encoder comprises a convolutional neural network, and
each of the plurality of coding units comprises one or more convolutional layers and one or more pooling layers.

16. The inspection apparatus according to claim 5, wherein
the encoder comprises a convolutional neural network, and
each of the plurality of coding units comprises one or more convolutional layers and one or more pooling layers.

17. The inspection apparatus according to claim 2, wherein the processor is configured with the program to perform operations
further comprising operation as a setting unit configured to set a value of a parameter defining a degree of occurrence of an image area comprising a defect being extracted as an attention area,
such that operation as the area extractor is comprises extracting the attention area in accordance with the set value of the parameter.

18. The inspection apparatus according to claim 3, wherein the processor is configured with the program to perform operations
further comprising operation as a setting unit configured to set a value of a parameter defining a degree of occurrence of an image area comprising a defect being extracted as an attention area,
such that operation as the area extractor is comprises extracting the attention area in accordance with the set value of the parameter.

19. The inspection apparatus according to claim 4, wherein the processor is configured with the program to perform operations
further comprising operation as a setting unit configured to set a value of a parameter defining a degree of occurrence of an image area comprising a defect being extracted as an attention area,
such that operation as the area extractor is comprises extracting the attention area in accordance with the set value of the parameter.

20. The inspection apparatus according to claim 5, wherein the processor is configured with the program to perform operations
further comprising operation as a setting unit configured to set a value of a parameter defining a degree of occurrence of an image area comprising a defect being extracted as an attention area,
such that operation as the area extractor is comprises extracting the attention area in accordance with the set value of the parameter.

* * * * *